US006982939B2

(12) United States Patent
Powelson et al.

(10) Patent No.: US 6,982,939 B2
(45) Date of Patent: Jan. 3, 2006

(54) WRITE COMPENSATION FOR DATA STORAGE AND COMMUNICATION SYSTEMS

(75) Inventors: Judith C. Powelson, Alameda, CA (US); David K. Warland, Davis, CA (US); Ian E. Harvey, Lake Forest, CA (US); Yung-Cheng Lo, San Leandro, CA (US); Christine Pepin, Menlo Park, CA (US); Steven R. Spielman, Oakland, CA (US); Ting Zhou, Albany, CA (US); Jonathan A. Zingman, Oakland, CA (US)

(73) Assignee: LSI Logic Corporation, Milpitas, CA (US)

( * ) Notice: Subject to any disclaimer, the term of this patent is extended or adjusted under 35 U.S.C. 154(b) by 626 days.

(21) Appl. No.: 10/012,257

(22) Filed: Nov. 8, 2001

(65) Prior Publication Data

US 2002/0126604 A1 Sep. 12, 2002

Related U.S. Application Data

(63) Continuation-in-part of application No. 09/496,898, filed on Feb. 2, 2000.

(51) Int. Cl.
*G11B 5/09* (2006.01)

(52) U.S. Cl. ................. 369/47.53; 369/53.26; 369/53.34; 369/59.12

(58) Field of Classification Search .............. 369/47.17, 369/47.18, 47.25, 47.27, 47.28, 47.35, 47.5, 369/47.51, 47.52, 47.53, 47.55, 53.26, 53.31, 369/53.34, 59.12, 59.21, 59.23, 59.24
See application file for complete search history.

(56) References Cited

U.S. PATENT DOCUMENTS

| 5,726,965 | A  |   | 3/1998  | Hajjar et al. |
| 6,160,784 | A  |   | 12/2000 | Maeda et al. |
| 6,269,060 | B1 | * | 7/2001  | Harvey et al. ........... 369/47.28 |
| 6,771,570 | B1 | * | 8/2004  | Wong et al. ............... 369/30.1 |

FOREIGN PATENT DOCUMENTS

| EP | 0 477 892 A2 | 9/1991 |
| EP | 0 978 827 A2 | 2/2000 |
| WO | WO 01/57856 | 8/2001 |

OTHER PUBLICATIONS

Fredricksen, Harold, "A Survey of Full Length Nonlinear Shift Register Cycle Algorithms", SIAM Review, vol. 24, No. 2, Apr. 1982, pp. 195–221.

* cited by examiner

*Primary Examiner*—Paul W. Huber
(74) *Attorney, Agent, or Firm*—Christopher P. Maiorana PC

(57) ABSTRACT

Methods and systems for write compensation for optimizing the performance of a data storage or communication channel are disclosed. In one embodiment, a method comprises determining channel sensitivity to modifications in write signal parameters, detecting systematic errors in a read signal recovered from data written with a first set of write parameters, and adjusting the write signal parameters by an amount determined from the channel sensitivity such that the systematic errors are reduced when data are written with the adjusted write parameters.

62 Claims, 29 Drawing Sheets

Write compensation system

Data formatter

Data formatter

Write-strategy calculator

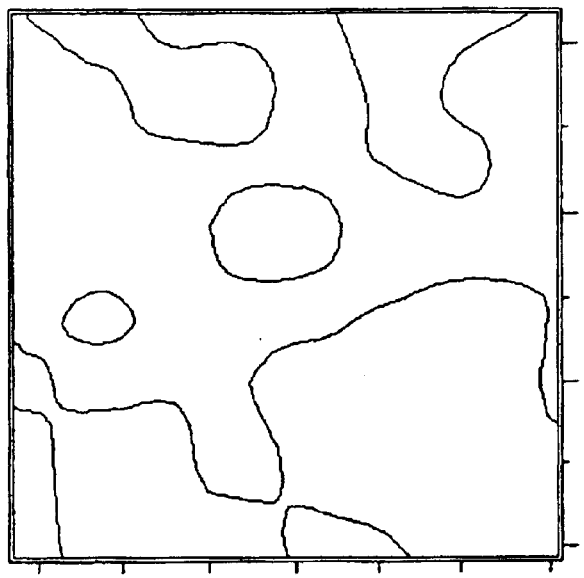
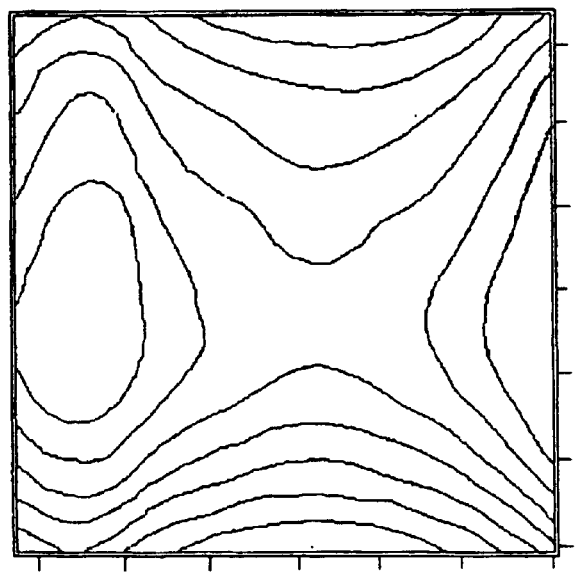
Figure 6D

ELC = Equal Level Criteria
CDC = Constant Discriminability Criteria

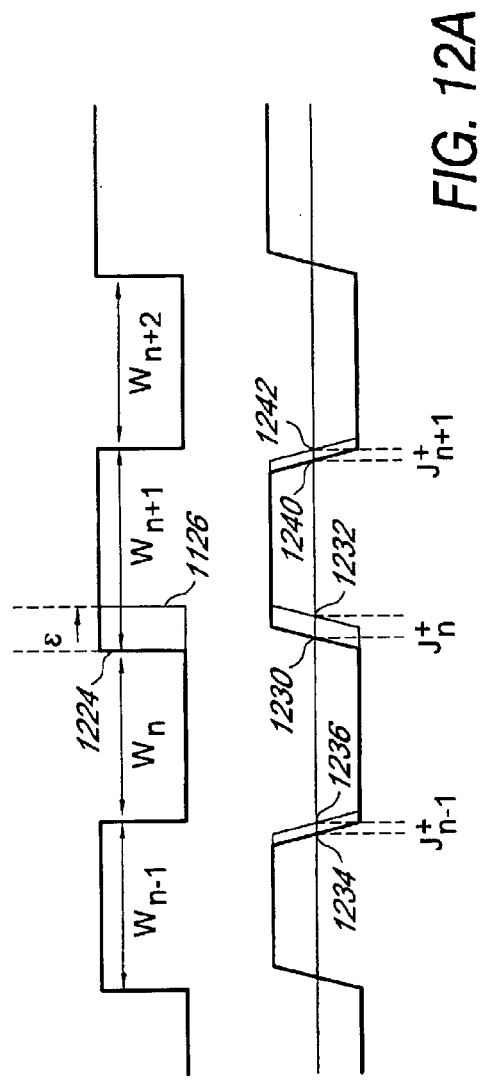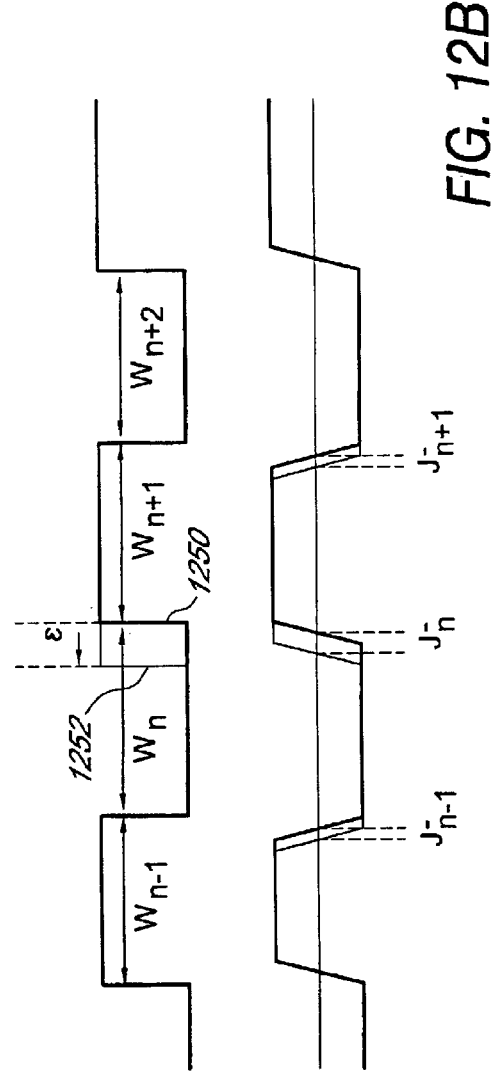

WRITE COMPENSATION FOR DATA STORAGE AND COMMUNICATION SYSTEMS

CROSS REFERENCE TO RELATED APPLICATIONS

This application is a continuation-in-part of, and claims priority to U.S. patent application Ser. No. 09/496,898, entitled Write Compensation for a Multi-Level Data Storage System, and filed on Feb. 2, 2000.

FIELD OF THE INVENTION

The present invention relates generally to data storage. More specifically, a system and method for write compensation is disclosed.

BACKGROUND OF THE INVENTION

In data storage and data communication environments, to maximize the storage capacity for a given volume of recording medium, and to maximize the rate of data transmission, it is desirable that the written bits have as high an information density as possible. As the information density increases, however, regions of data symbols increase their "interference" with both the writing and recovery of neighboring symbols. Without careful compensation for such interference, information may be distorted or lost. While it is possible to compensate for this inter-symbol-interference (ISI) after readout, it is most desirable to compensate for ISI before recording to minimize noise enhancement resulting from data passing through the system.

Description of Linear and Nonlinear ISI

Mathematically, ISI can be classified into two types: 1) linear ISI and 2) nonlinear ISI. Equation (1) formalizes this definition.

$$y(t) = h_0 + \sum_{n=1}^{\infty} \int_{-\infty}^{+\infty} \cdots \int_{-\infty}^{+\infty} h_n(\tau_1, \ldots, \tau_n) x(t-\tau_1) \ldots x(t-\tau_n) d\tau$$

Here, the input time function x(t) is related to the output y(t) of a nonlinear system by a Volterra series with kernels $h_n$ and additive zero-mean random noise $\eta(t)$. If the relationship between the input x(t) and output y(t) is linear, the first two terms containing $h_0$ and $h_1(\tau)$ are all that are necessary to completely describe the system. If the relationship between input and output includes nonlinear ISI, additional terms are necessary to describe the relationship.

Because of the increased computational complexity of processing or removing nonlinear distortions in a data storage system, it is desirable to make the system behave like a linear channel. In a linear channel, the relationship between the data input and the recovered signal can be completely described by a convolution of a linear filter with the input plus some additive random noise. From a coding and signal processing perspective, linearity is also desirable because historically there is a massive amount of theoretical work completed using linear channels. If a system can be made to behave linearly, the techniques and knowledge resulting from this large body of work can then be applied.

In one embodiment of a multi-level (ML) optical data storage system, a long track is divided into a large number of small regular data cells. A laser is used to either write to or read from the individual cells. In such an optical storage system, a primary source of inter-symbol-interference (ISI) is the size of the reading and writing laser beams. As the data cells are packed together, the effects of neighboring symbols on both the formation and recovery of the data cells increases. During read-back, the reading laser beam illuminates a region of material that contains more than one data cell. As a result, the signal associated with the data cell of interest includes a linear convolution of signals from its neighbors.

During the writing process, effects such as thermal diffusion and the overlap from the tails of a Gaussian recording laser beam modify the state and response of neighboring cells. These effects produce nonlinear ISI. Diffraction effects (which are linear in amplitude, not intensity) also contribute to nonlinear ISI, as do non-ideal effects related to the read-back process such as the nonlinearity of the photodiode and amplifiers. As a result of the above sources of ISI, the recovered data signal from a high-density recording and read-back system is corrupted by linear ISI, nonlinear ISI, and noise.

Variation in the recording process due to systematic variation of either the media response or the writing process also corrupts the recovered data signal. For example, variation of the size and shape of the reading beam during read-back may change the amount of inter-symbol-interference. Variation in the sensitivity of the media during recording may change the size and shape of the recorded marks. Because these effects result in a systematic or deterministic source of error, the impact of many of these error sources could potentially be minimized through careful write compensation.

Shaping the Channel

FIG. 1A is a diagram illustrating Shannon's original abstraction of a general communication system. An information source 102 generates a signal x(t) that is transmitted by a transmitter 104 through the system or "channel" 106 to receiver 108 and a final destination 110. Along the path from the information source 102 to the destination 110, the transmitted signal may be corrupted by both deterministic and random transformations. For example, a random noise source 112 is shown as an input to channel 106. It is the goal of the transmitter 104 in a communication or storage system to compensate for the effects of such corruption. For example, a transmitter in a robust information system will add redundancy to combat the particular noise structure involved.

It would be useful if a way could be provided to write compensate for deterministic transformations that occur in the channel. Write compensation refers to compensation that occurs during the writing process. Read compensation refers to compensation that occurs during the reading process. Compensation in general may occur during the writing process and/or during the reading process.

If a particular reading system design can only recover data that have undergone a linear transformation, then any nonlinear transformation may be classified as noise. It would be desirable to remove as many deterministic sources of such "noise" as possible using write compensation so that a reading system designed to compensate for linear transformations by the channel may be used effectively.

In general, both read and write compensation techniques are needed to maintain an acceptable signal to noise ratio (SNR) as information density increases on a storage medium. To the extent that write compensation can be used to cause the channel output to be linear or to conform to some desired target, the reading system may be simplified. Also, techniques are needed for compensating for transformations caused by various sources such as physical variations in a recording device or recording material response that occur as a result of manufacturing, wear, or environmental conditions.

SUMMARY OF THE INVENTION

The invention includes methods and systems for write compensation for optimizing the performance of a data storage or communication channel. In one embodiment, a method comprises determining channel sensitivity to modifications in write signal parameters, detecting systematic errors in a read signal recovered from data written with a first set of write parameters, and adjusting the write signal parameters by an amount determined from the channel sensitivity such that the systematic errors are reduced when data are written with the adjusted write parameters. Another method of adjusting a data write operation in an optical data storage or communication channel comprises indexing transition types based on the pattern of neighboring transitions within a fixed time window of each indexed transition, defining a plurality of write strategy parameters corresponding to different ones of the indexed transitions, and controlling write laser operation in accordance with the plurality of write strategy parameters when writing the indexed transitions.

In another embodiment, a method of compensating a data writing process in a binary optical disc storage channel using a write strategy matrix comprises shifting at least one of the data transitions in a first data pattern by a predetermined amount to form a perturbed data pattern writing the perturbed data pattern to the storage channel, recovering the perturbed data pattern from the storage channel, and comparing the timing of transitions in the recovered data patterns to determine timing sensitivities. In addition, a second data pattern is generated having a plurality of binary levels. The method further comprises writing the second data pattern to the storage channel, recovering the second data pattern from the storage channel, and comparing the timing of transitions in the recovered second data pattern to target timing transition locations to determine systematic errors. The method continues with the steps of calculating write strategy parameters using the timing sensitivities and the systematic errors and updating the write strategy matrix with the write strategy parameters.

Optical data storage drives are also provided. In one embodiment, and optical drive comprises a memory storing a write strategy matrix, a write control circuit configured to control a write laser in accordance with the write strategy matrix and a read signal transition detector configured to measure the location of read signal transitions. Also provided is a processing circuit coupled to the read signal transition detector and configured to update the write strategy matrix using at least in part locations of read signal transitions detected by the read signal transition detector. In addition, a write control process comprises writing a data pattern with a write signal which has at least a portion thereof perturbed in a pre-defined manner with respect to a nominal write procedure, recovering a read signal produced by the data pattern, detecting characteristics of the read signal, and computing a second write procedure different from the nominal write procedure using the characteristics.

In an application to constant-angular-velocity recording, one embodiment of the invention comprises spinning an optical disk at a constant-angular-velocity regardless of the radial position of the write head, writing data at a first radial position on the disk using a first write strategy matrix, and writing data at a second radial position on the disk using a second write strategy matrix.

BRIEF DESCRIPTION OF THE DRAWINGS

The present invention will be readily understood by the following detailed description in conjunction with the accompanying drawings, wherein like reference numerals designate like structural elements, and in which:

FIG. 6D is a sample contour plot illustrating systematic signal error for a level 3 symbol as a function of its two nearest neighbors before and after precompensation.

FIGS. 8A–8C illustrate the write compensation process used in one embodiment and described in detail above.

FIG. 12A illustrates a positive write signal perturbation and the effect on the read back signal.

FIG. 12B illustrates a negative write signal perturbation and the effect on the read back signal.

DETAILED DESCRIPTION

Figure 1A:
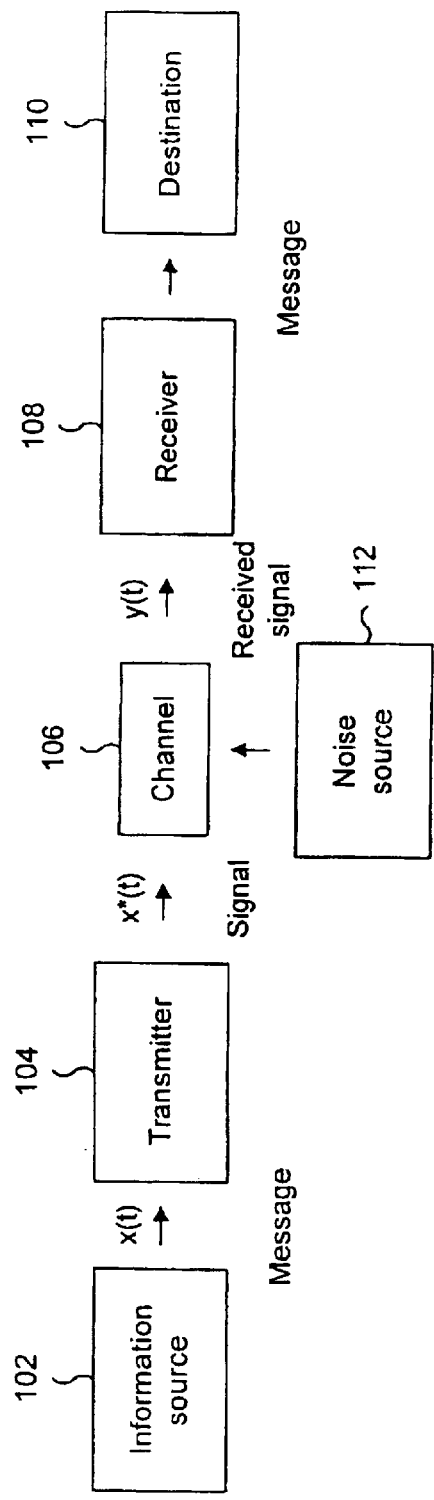
FIG. 1A is a diagram illustrating Shannon's original abstraction of a general communication system.

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

In one embodiment, this invention applies to the methods of writing marks on a phase change material as described in U.S. patent application Ser. No. 09/373,916, filed Aug. 12, 1999, entitled "High Density Data Write Strategy" (hereinafter O'Neill et. al.). O'Neill et al. is incorporated, in its entirety, herein by reference. As described in O'Neil et al., marks can be written in a manner such that their size can be less than the size of the focused spot of a writing laser. By forming marks smaller than the reading laser beam, the reflectivity of a region of material can be varied with great precision. The reflectivity of a region is controlled by varying the relative amount of material in crystalline and amorphous phases. The total amount of crystalline and amorphous material in a region is controlled by creating marks of various sizes or shapes. In turn, the mark size and shape is controlled by placing the leading and trailing edges of laser pulses such that the timing of a second laser pulse further modifies the region of material irradiated by a first pulse. Additional modification of the mark size and shape results from controlling the time course of the laser power during the pulse.

An ideal optical data storage system would read and recover a multi-level data pattern without any distortion or loss of data. In practice however, the data symbols are corrupted by deterministic and random processes during recording and read-back. To control the deterministic (i.e., systematic) sources of error, write compensation is used during the writing process to shape the relationship between the system input and output. FIG. 1B is a diagram illustrating a system with write compensation. A data generator 120 generates input data x(t). Data compensator 122 provides write compensation, meaning that input data x(t) is transformed into input data x*(t) so as to compensate for the manner that data storage system 124 transforms input data x(t).

The write compensation techniques described herein may be applied to any writing system that writes to any data channel, including data storage channels as well as data transmission channels. In general, a writing system that includes a laser will have various write strategy parameters. These write strategy parameters may include, among other things, laser power and numerous parameters that control the shape and timing of laser pulses including pulse width, duty cycle, frequency and spacing of pulses, as well as various possible pulse shaping parameters. The input data controls the write strategy parameters, causing the input data to be written to the disc. Write compensation is implemented by altering the way that the input data are mapped to the write strategy parameters. In one embodiment, this is accomplished using a write strategy matrix (WSM).

Example Multi-Level Optical Data Storage System

When a reading laser is incident on a region of recorded material, the reflected light can be measured and the state of the region can be determined. The state of the region represents stored data. Multiple levels ($n \geq 2$) of reflectivity are possible. Different levels of reflectivity represent different data levels.

In one embodiment that implements write compensation for the writing system described in O'Neill et. al., input data are mapped to write strategy parameters that precisely control the time course of writing laser pulses. The write compensation process alters the mapping of the input data to the write strategy parameters in a manner that alters the precise time course of the writing laser power. More than one element of the input data sequence controls the writing laser power at any given time. In one embodiment, three input data elements: a previous, a current, and a subsequent input data element are used to determine a current set of write strategy parameters. In another embodiment, five input data elements are used to determine a current set of write strategy parameters. It is also possible to have different numbers of previous and subsequent input data elements or to have only a single input data element control the write strategy parameters.

Write Compensation System Overview

Figure 1B:
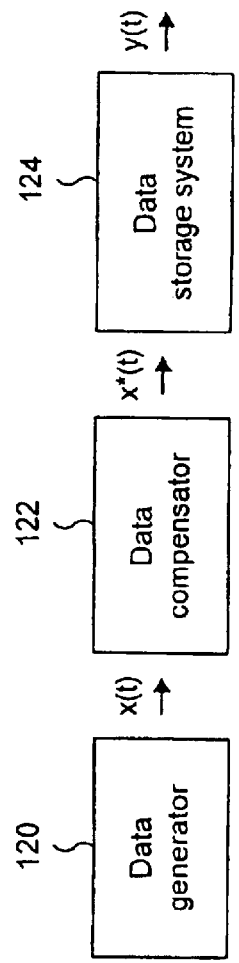
FIG. 1B is a diagram illustrating a generalized system with write compensation.
Figure 2:
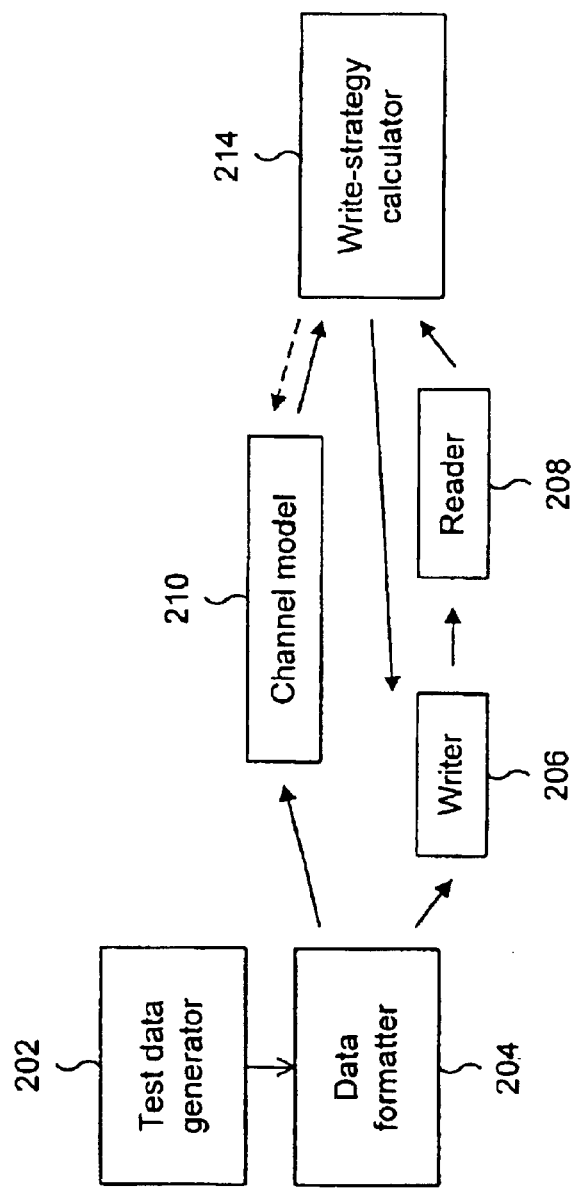
FIG. 2 is a block diagram illustrating a write compensation system such as may be included in data compensator of FIG. 1.

FIG. 2 is a block diagram illustrating a write compensation system such as may be included in data compensator 122 of FIG. 1. A data generator 202 creates a test pattern and communicates it to a data formatter 204, which organizes the data and adds various calibration and control patterns. The resulting formatted test pattern is separately passed through a physical channel, which comprises writer 206 and reader 208, as well as a channel model 210.

The data sequence passed to the writer 206 is converted to instructions that control the laser. This instruction set includes the specification of all relevant write strategy parameters for a given data sequence and is referred to as the Write Strategy Matrix (WSM). The recorded data are then read back by the reader 208, resulting in a recovered data pattern. The formatted test pattern that passes through the channel model 210 results in a target data pattern. The write strategy calculator (WSC) 214 compares the average recovered data pattern to the target data pattern and calculates an update to the write instruction set contained in the WSM. Thus, the write strategy calculator 214 changes the WSM and thereby changes how the input data sequence is mapped to the relevant write strategy parameters.

To measure the result of the update to the WSM, the test pattern is written and read again and the above procedure is repeated. If the mean-squared-difference between the target and recovered data pattern is less than a maximum threshold error value, the procedure terminates successfully. If the difference remains above the maximum threshold error value, the procedure iterates until the error converges to a value less than the maximum threshold error value.

In one embodiment, the channel model 210 is not fixed during the iterations. In this embodiment, a best linear fit to the data is computed as the channel model 210 and input to the write strategy calculator 214. In another embodiment, the channel model 210 is fixed to a particular target. In one embodiment, the signal dynamic range is constrained while the write strategy is computed. In another embodiment, the signal dynamic range is allowed to vary as the write strategy varies. In another embodiment, the signal dynamic range is optimized as part of the write strategy iteration process.

Test Pattern Generator and Formatter

Figure 3:
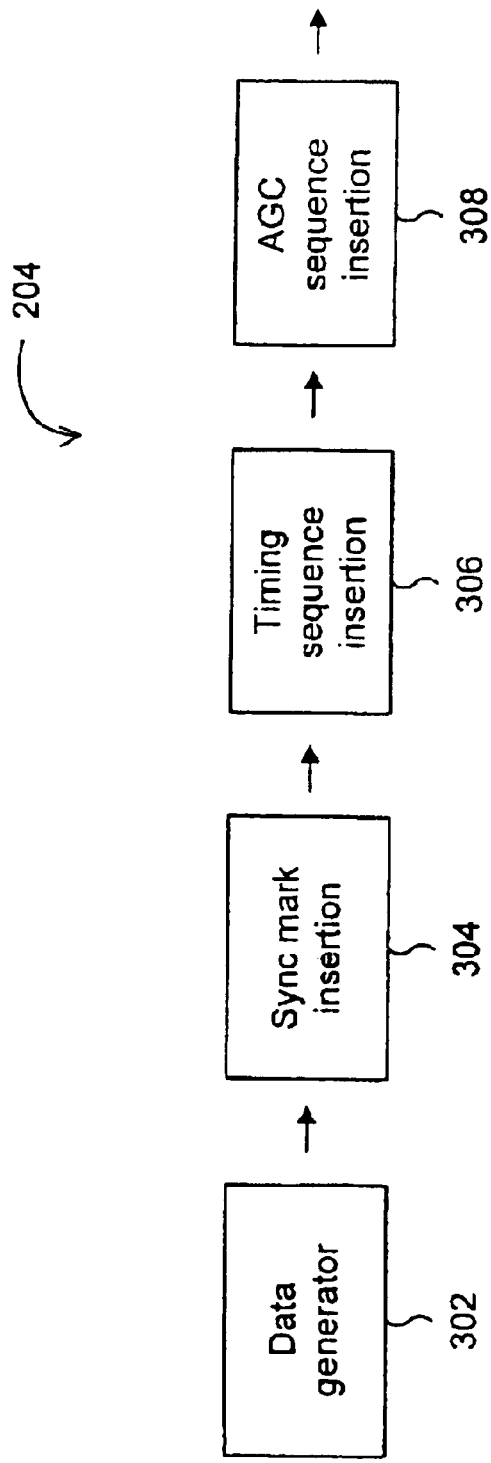
FIG. 3 is a block diagram of an exemplary data formatter such as may be included in the write compensation system of FIG. 2.

Various control sequences may be added to the test pattern of interest to aid in the recovery of data. The most significant of these types of control sequences include synchronization marks, timing and alignment sequences, and automatic-gain-control (AGC) sequences such as are described in U.S. patent application Ser. No. 09/253,808, filed Feb. 18, 1999, entitled "Architecture For Reading A Multi-Level Signal From An Optical Disc," and which is herein incorporated, in its entirety, by reference. FIG. 3 is a block diagram illustrating in greater detail an exemplary data formatter 204. A data generator 202 outputs data to a sync mark insertion block 304. The output of sync mark insertion block 304 is input to a timing sequence insertion block 306. The output of timing sequence insertion block 306 is input to an AGC sequence insertion block 308.

In one embodiment, two types of test patterns are used in the write compensation process. Type I patterns are used in determining the level placements and initializing the WSM and type II patterns are used in the WSM update process.

The process of initializing the WSM is important for proper functioning of the write compensation procedure. The initialization procedure begins with a measurement of the relationship between the write strategy parameters and the resulting reflectivity of the data mark. Based on the output detected when the type-I pattern is written to the disc, the write strategy calculator (WSC) chooses write strategy parameters that span about 10% less than the full range of the media response. This choice maximizes the recovered signal strength. FIG. 6B is a graph illustrating an example of such a relationship and the typical nonlinear response of an optical media to a write strategy parameter. Points A and D label the minimum and maximum reflectivity of the media achieved by the write strategy. Points B and C mark the useable dynamic range for the initial WSM values (typically 10% less than the saturated response). The variance of all parts of this curve are also measured and used to optimally place the levels with the techniques described below.

The purpose of the type-I pattern is to sample reflectivity values resulting from a particular choice of write strategy parameters. The resulting data are then used by the write strategy calculator to initialize the WSM. An example of a type-I pattern for the write strategies outlined in U.S. patent application Ser. No. 09/373,916, filed Aug. 12, 1999, entitled "High Density Data Write Strategy" which is herein incorporated by reference, hereinafter O'Neill et. al. is given below. In the example given, the laser power associated with each pulse is fixed and the pulse width is chosen as the write strategy parameter that is varied by the input data to control the reflectivity of a mark.

In this example, a single write strategy parameter is varied to modulate the output. In other embodiments, a combination of write strategy parameters is used. The combination of write strategy parameters may be specified by the WSM or, alternatively a single index may be determined by the WSM that maps to a plurality of write strategy parameters.

Figure 6A:
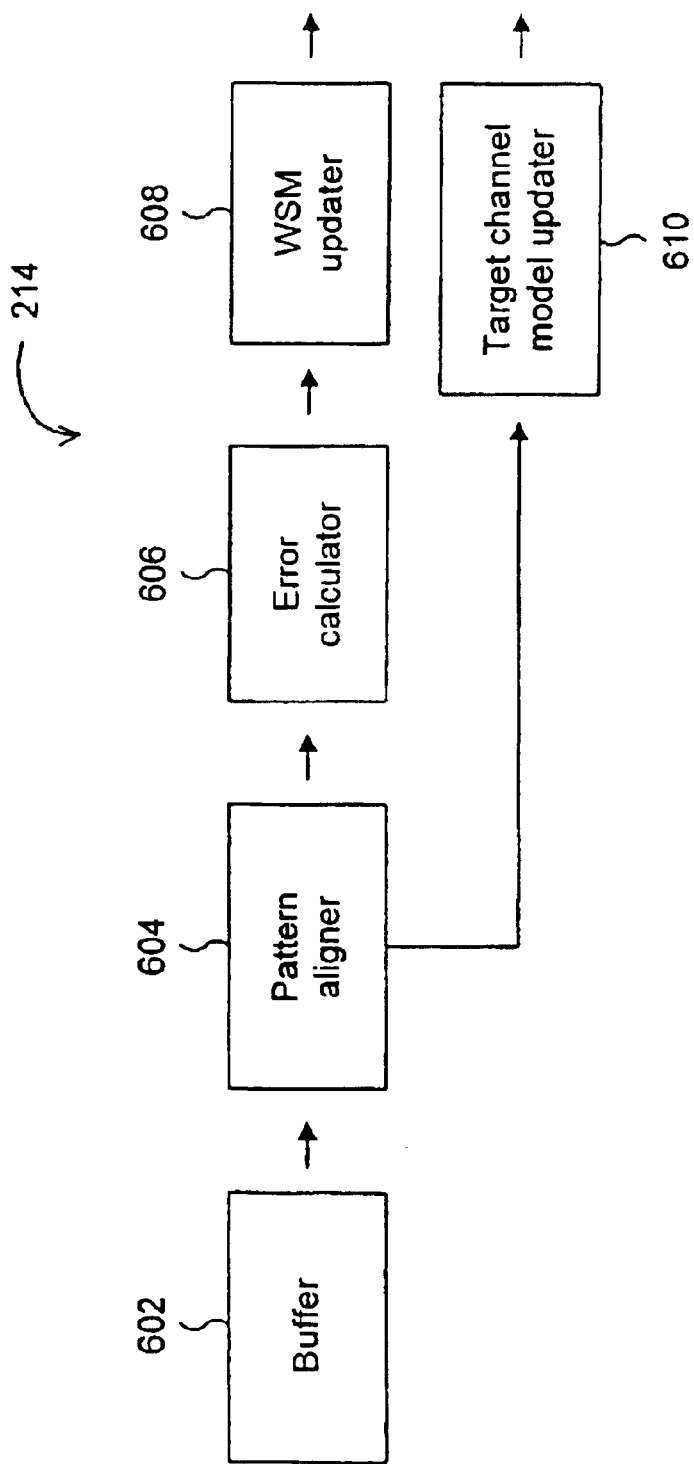
FIG. 6A is a diagram illustrating in further detail the Write Strategy Calculator shown in FIG. 2.
Figure 6B:
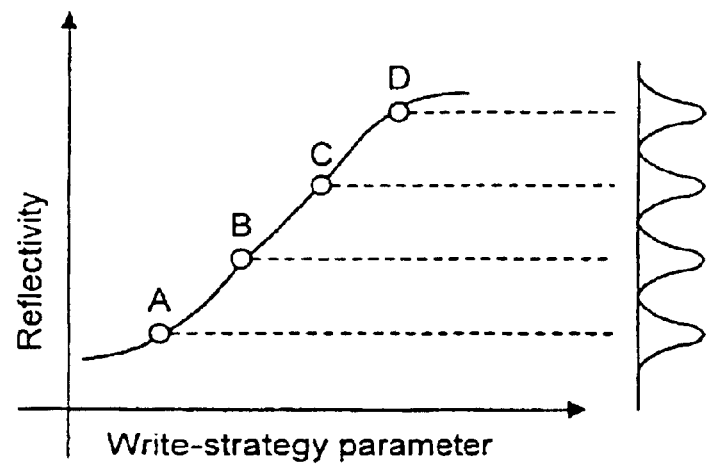
FIG. 6B is a graph illustrating an example of the typical nonlinear response of an optical media to a write strategy parameter.
Figure 6C:
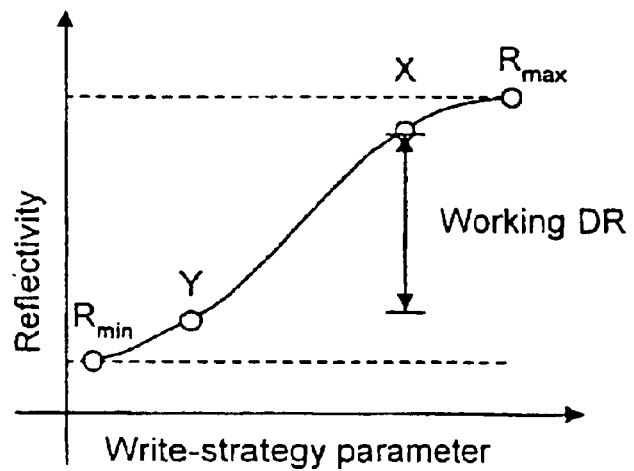
FIG. 6C is a graph illustrating an example of a sequential scan through pulse width and the resulting changes in reflectivity.

FIG. 6C is a graph illustrating an example of a sequential scan through pulse width and the resulting changes in reflectivity. The type-I test pattern "T1" that was used in this example can be represented by a series of integers representing pulse width: 1,2,3,4,5,6,7,8,9,10,11,12,4,0,4 where 0=laser off. The last elements of the sequence, 4,04, are included as a sync mark.

For small marks, the effects of ISI result in an ambiguous measurement of an isolated mark's reflectivity. For this reason, the effects of ISI are controlled by placing the mark of interest within a series of neighbors of the same mark type. Therefore, it is preferable to repeat each mark numerous times in the test pattern. Repeating each mark numerous times in the test pattern controls the inter-symbol interference between marks. Measurements taken in the middle of a series of identical marks include inter-symbol interference only from neighboring identical marks.

For example, to obtain the relationship between pulse width and reflectivity shown in FIG. 6C, each mark type was repeated 9 times in the test pattern T1, yielding a pattern of minimum length marks: 1,1,1,1,1,1,1,1,1,2,2,2,2,2,2,2,2, . . . .

Because the relationship between reflectivity and pulse width is approximately proportional for a range of pulse widths, a "stair-step" pattern of reflectivity results from a sequential scan of pulse width. For each repeated group of 9 marks, the mean and variance of the center mark of the group is measured and passed to the algorithm for placing the levels.

Test pattern T2 (4,0,4,9,10,1,11,12,5,14,4,8,3,13,2,7,6) is an alternate test pattern that contains less low-frequency signal power than pattern T1. It is generated by re-arranging test pattern T1 such that there is less low frequency spectral content. In general, DC balanced patterns are necessary for other sub-systems to successfully AC-couple to the RF output signal from the disc. For example, without proper DC control, data could contain a large frequency component that matches a resonance in the tracking or focusing lens servo. Cross-talk from the data path could then cause these servo loops to behave unpredictably resulting in poor data quality or a loss of tracking. On the data side, proper recovery of multi-level (ML) data with no DC control requires the read channel gain to be constant all the way down to DC. As a result, poor ML signal quality would result from AC-coupling to the read signal.

Other patterns are also used to initialize the WSM in other embodiments. The patterns described as examples above illustrate several advantages that are preferred in other patterns that may be selected. The full range of reflectivity is probed because the pattern varies from a level that does not substantially affect the media to a level that saturates the media. The effects of ISI are controlled by repeating each mark in the pattern. Statistics are measured for the output produced and DC and low frequency control is implemented.

Because different combinations of multilevel symbols contribute differently to nonlinear ISI, type-II test patterns are designed such that they contain all possible combinations of subsequences of multilevel symbols of a certain length. For efficient use of recording space and computation time, the test pattern is designed to have minimal length. For writing and reading servo stability, it is desirable to design the sequence such that it has no strong spectral components at low frequencies.

A well known class of sequences called "deBruijn sequences" have the desirable property that given a sequence of symbols from an 'm' letter alphabet, all 'k-tuples' occur in one cycle of the sequence. In the discussion below, an "mxk" sequence is a sequence that presents all possible k-tuples in an m-letter alphabet. The deBruijn sequence achieves this property with minimal length (i.e. no other sequence has a shorter length). Given that the deBruijn parameters m and n specify the size of the deBruijn sequence, there are multiple distinct deBruijn sequences with this above property. By varying the 'seed' of the deBruijn sequence generator, low frequency spectral components of the sequence can be minimized.

In one embodiment, for a write compensation system that maps sets of 3 input symbols (triplets) to the write strategy parameters, an 8×5 deBruijn sequence that efficiently explores all possible quintuplets of an 8 symbol set is used as a type-II pattern. For a write compensation system that maps triplets to the write strategy parameters, a repeating 8×3 deBruijn sequence may also be used. The advantage of the 8×5 sequence is that the effects of the next-nearest neighbors can be explicitly averaged.

In another embodiment, the type-II pattern is generated using the shift register sequences described in U.S. patent application Ser. No. 09/496,387, filed Feb. 2, 2000, entitled "Generating A Multilevel Calibration Sequence For Precompensation". The shift register sequences are easier to generate in some cases than the deBruijn sequences. In some embodiments, the type 1 and type 2 patterns may be altered to reduce low frequency signal content as is described in U.S. patent application Ser. No. 09/496,897, filed Feb. 2, 2000 entitled "DC Control of a Multilevel Signal". In another embodiment, a random or pseudo-random sequence of data is used and a DC control algorithm is applied to the sequence. The length is chosen to be sufficient such that all subsequences of interest are sampled with adequate statistics.

Write Channel

Figure 4A:
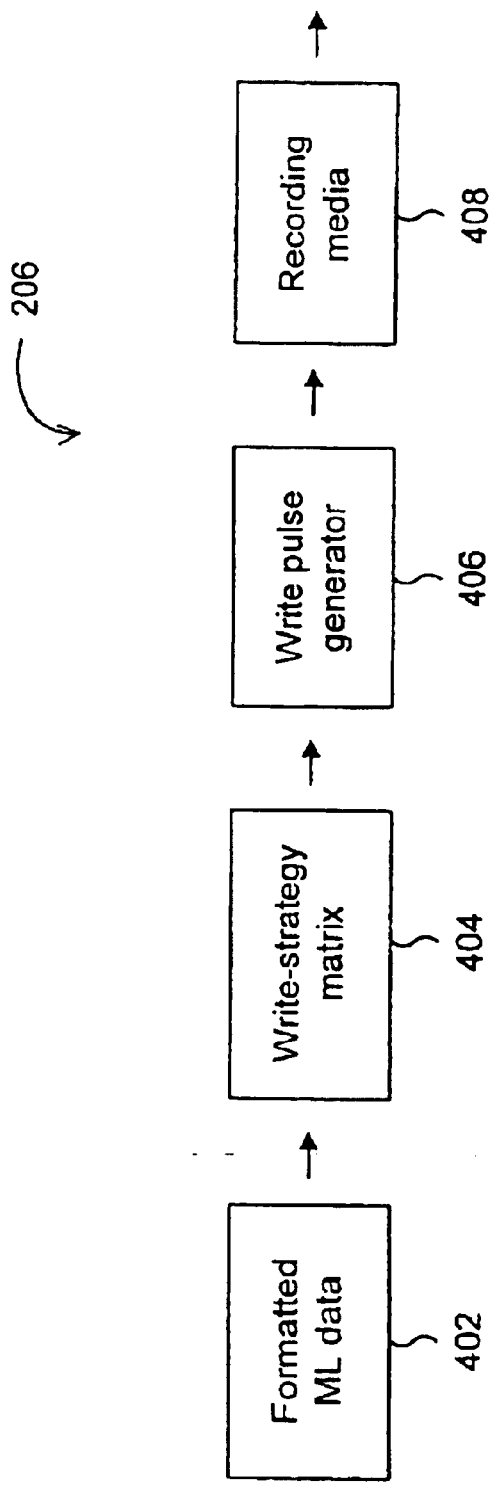
FIG. 4A is a block diagram illustrating in further detail the Data Writer shown in FIG. 2.

FIG. 4A is a block diagram illustrating in further detail Writer 206 shown in FIG. 2. Formatted ML data are input to the WSM 404. WSM 404 maps the data to one or more write strategy parameters. Based on the write strategy parameters, the write pulse generator 406 modulates the precise time course of the laser that is incident on recording media 408. By applying a sliding window to the formatted ML data, subsequences of length m are sequentially selected that index WSM elements which, in turn, provide instructions to the write pulse generator. The reflectivity of the resulting ML marks on recording media 408 is then recovered by the reader and further processed.

The central set of laser control instructions are contained in the WSM (WSM). This matrix provides a method for indexing the detailed laser pulse generating instructions based on short sequential ML sequences. In the example illustrated, the length of the ML sequences is three marks (referred to as a triplet), where the center value represents the type of mark currently being written and the first and third values represent the preceding and following marks respectively. By using an index that includes the neighboring marks in the WSM, it is possible to shape the recovered signal to a particular target. As discussed above, this target is usually chosen to be a linear transformation of the input sequence. Larger indexing sequences are used in other embodiments to compensate for longer-range interference effects. However, longer indexing sequences require exponentially more memory and data to calculate the WSM.

As described above, in one embodiment, triplets are used in the WSM, and the write strategy parameters for each triplet are derived by averaging initialization data that includes all possible sequences of 5 input symbols. Thus, the write strategy parameters defined for each triplet are actually an average of the best write strategy parameters for all possible sequences of 5 that include the triplet in the middle.

Figure 4B:
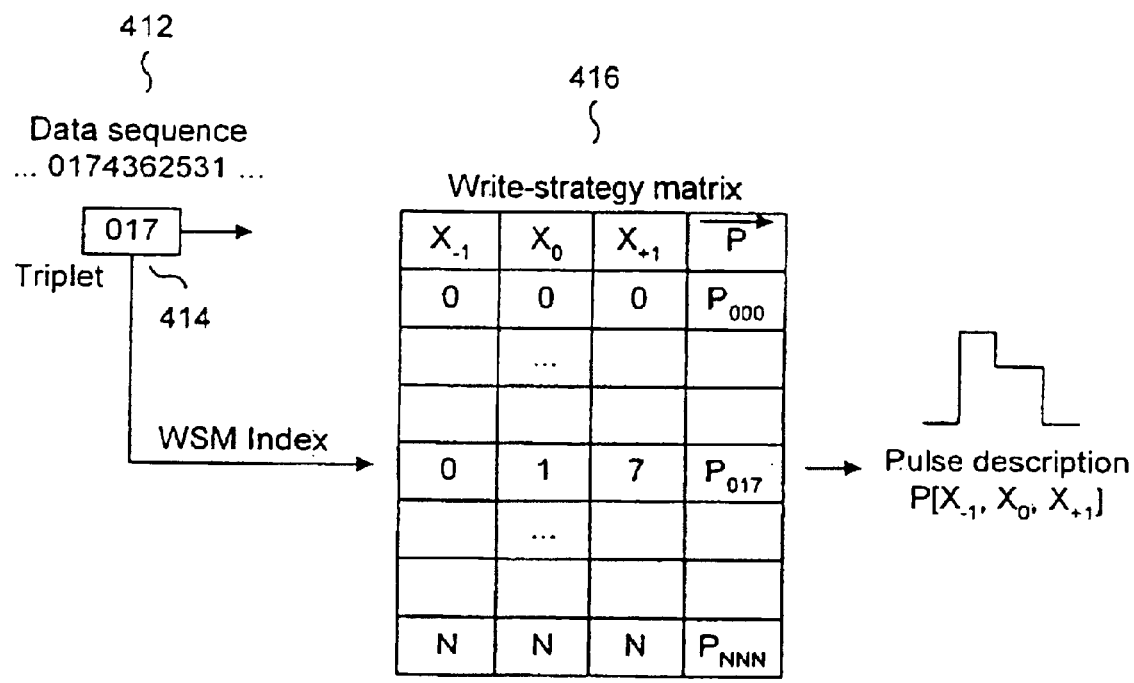
FIG. 4B is a diagram illustrating how the write strategy matrix is used to look up successive write strategy parameters for a ML data sequence in one embodiment.

FIG. 4B is a diagram illustrating how the WSM is used to look up successive write strategy parameters for a ML data sequence in one embodiment. A long ML data sequence 412 contains encoded data or test patterns. This data sequence can be represented as a string of integer values that range from zero to m−1, where m is the number of discrete levels in the ML system. A data pointer 414 into sequence 412 locates the mark to be written to the recording medium. After each tick of the write clock, the pointer moves to the next data position and locates the next sequence of marks to be recorded. The next sequence of marks in the example shown is 017.

The subsequence that is selected by the sequentially moving data pointer is used as an index into WSM 416. In the example shown, the data pointer points to the center of the triplet 017. In other embodiments, other subsequence reference points are used. For example, if nonlinear effects that are targeted for removal by the write compensation procedure are mostly due to the marks written prior to the current mark, it may be advantageous to reference to the beginning or end of the sub-sequence. As the data pointer moves sequentially through the sequence, the sub-sequence changes accordingly and is used as the index into the WSM for retrieval of the laser control instructions.

In the following discussion, the sub-sequence is assumed to have a length of three and functions as an index into the WSM. As mentioned above, index lengths other than triplets are used in other embodiments.

In one embodiment, WSM 416 may be implemented simply as a table of values. The size of this matrix is N×M where N=n_params is the number of write strategy parameters (usually one) being used to control the mark reflectivity and $M=m^{n\_index}$ is the total number of unique indices with length n_index for a multi-level code with m levels.

In certain embodiments, some write strategy parameters may vary on a mark by mark basis while others vary more slowly. In such a case, there may be one entry for each of the write strategy parameters that is being varied on a mark by mark basis and the other write strategy parameters that may be varied slowly (i.e. power control) are stored separately from the WSM. This may reduce the size of the memory needed to implement the write compensation.

Note that if a recording system is designed to compensate for inter-symbol-interference that extends beyond nearest neighbors, the WSM increases in size in order to compensate for this ISI. For example, a write compensation system that corrects for effects due to next-nearest neighbors increases by a factor $m^2$, where m is the size of the multi-level alphabet.

The order of the M matrix elements is designed to correspond to the method of indexing the WSM. In one embodiment, n_params=1, n_index=3, m=8, and $x_{-1}$, $x_0$, $x_{+1}$ contain the previous, current, and future mark types to be written at a particular instant in time. In this embodiment, the WSM can be represented by $8^3$=512 numbers ordered in such a way that each possible mark triplet [$x_{-1}$, $x_0$, $x_{+1}$] locates a unique position in the WSM.

For each tick of the write clock, the data pointer is incremented and a sub-sequence is extracted from the data sequence and used as an index into the WSM. For an index consisting of a triplet in an 8-level system, one of 512 possible write strategy parameters is indexed by the triplet. This parameter, or set of parameters, is then sent to the write pulse generator, which then generates the pulse sequences that control the laser power delivered to the disc recording medium.

Figure 4C:
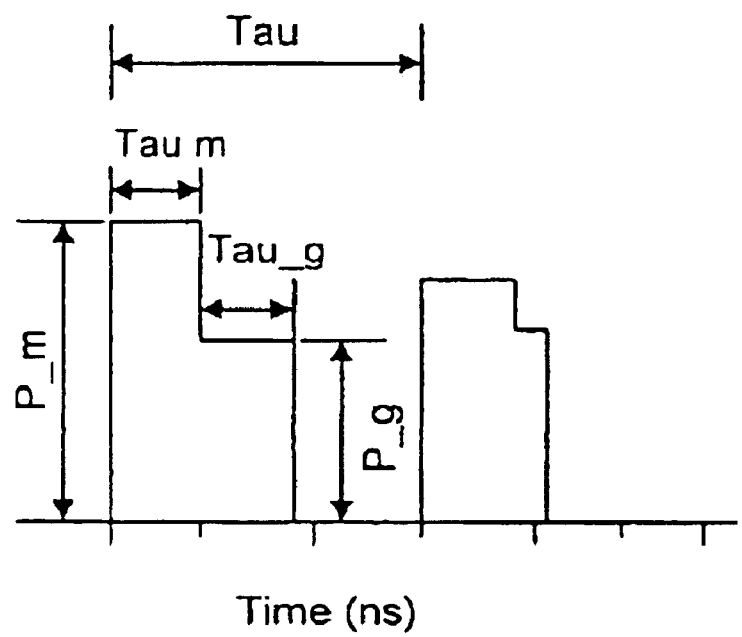
FIG. 4C is a diagram illustrating a write strategy that uses a pulse having a variable power.

FIG. 4C is a diagram illustrating a write strategy that uses a pulse having a variable power. The pulse power is varied so that the shape of a mark within a cell is varied. The pulse type illustrated in FIG. 4C is defined by five parameters: Tau, Tau_g Tau_m, P_g and P_m. In the example shown, the pulse begins with maximum power P_m and continues for a duration Tau_m at maximum power. Then, the pulse transitions to an intermediate power level P_g for a time Tau_g. After interval Tau_g, the pulse ends. As with all of the described write strategies, when the pulse ends, the power may either be zero power or a biasing power. Varying the power during a pulse changes the shape of a mark written by the pulse. In one embodiment, lowering the power in the middle of a pulse decreases the size of the amorphous mark by promoting the growth of crystalline material beginning at the outside boundary of the mark. This growth can be precisely controlled by varying Tau_g. A short Tau_g results in a large amorphous mark and low reflectivity while a long Tau_g results in a small amorphous mark and high reflectivity.

In one embodiment, the write strategy parameters Tau, Tau_m, P_m and P_g are fixed or slowly varying and the parameter Tau_g varies on a mark by mark basis as specified by the WSM. In other embodiments, other parameters or sets of parameters can be varied based on the WSM.

The structure of the WSM is general purpose and can be applied to other write strategies without loss of function. The write strategies contained in U.S. patent application Ser. No. 09/373,916, filed Aug. 12, 1999, entitled "High Density Data Write Strategy" which is herein incorporated by reference, hereinafter O'Neill et. al. are shown as examples only. The write compensation algorithm described here can be applied to write strategies and write strategy parameters other than the ones mentioned as examples.

The write pulse generator of FIG. 4A can utilize various techniques for controlling the laser power. The laser power may be modulated or the laser may be pulsed with the pulse duration of the laser being varied, or both the pulse power and the pulse duration may be varied. The laser power may be modulated directly or by varying the amount of laser light that passes through a light modulator. Also, the time that the laser irradiates a portion of the disc may be varied by changing the rate of rotation of the disc. All of these factors may be controlled by one or more write strategy parameters determined by the WSM.

In one embodiment, a fully programmable write laser control signal is generated using a multiplexer that selects inputs from different delay lines for the purpose of precisely adjusting the timing of write signal transitions derived from the multiplexer output such as is described in U.S. patent application Ser. No. 09/393,208, filed Sep. 9, 1999, entitled "Programmable Write Signal Generator" which is herein incorporated by reference. The delay lines may be obtained by using one or more delay lock loops referenced to an external clock to derive delay control voltages for delay cells. The delays produced by the delay cells are precisely defined fractions of the external clock period and are independent of fluctuation in temperature or power supply voltage. The derived delay voltages are input to delay stages to precisely generate delays for the input delay lines. The delay line corresponding to the exact desired delay can be selected by the multiplexer.

It should be understood that other suitable methods of generating a laser write control signal may be used to generate write signals according to the strategies disclosed herein. The write strategies disclosed herein may be used with any available technique for generating the specified write signals.

Read Channel

Figure 5:
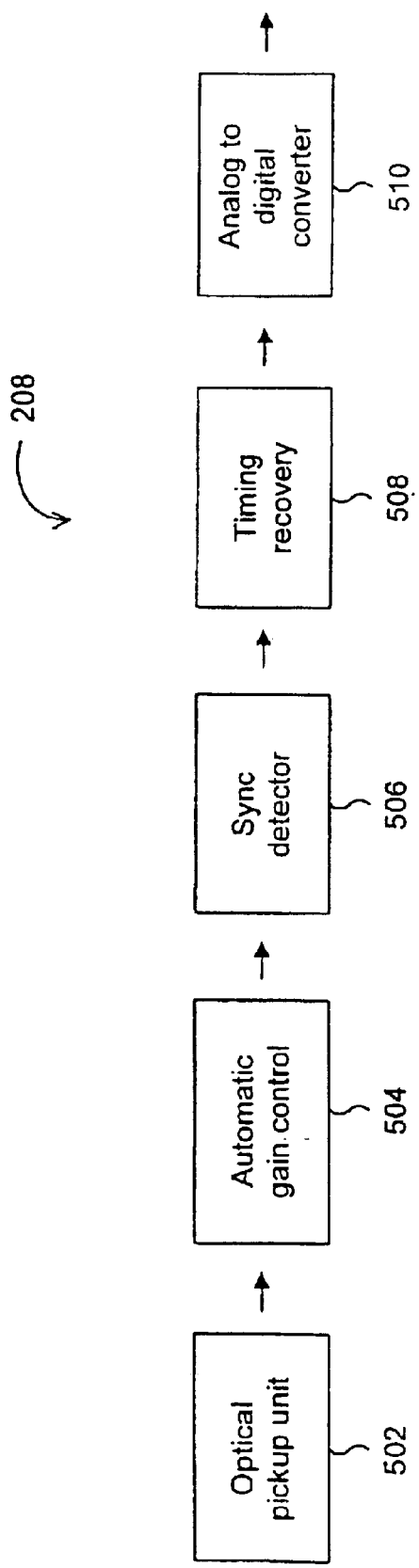
FIG. 5 is a diagram illustrating in further detail an exemplary reader such as may be used in the write compensation system of FIG. 2.

FIG. 5 is a diagram illustrating in further detail reader 208 shown in FIG. 2. It is at this processing stage that many of the inserted formatting sequences are used. The read channel front-end samples the voltage representing the disc reflectivity such that the data are protected from the effects of noise and sampling errors.

An optical pickup unit (OPU) 502 measures the reflection of a reading laser from a disc. In one embodiment, a reading laser is focused to a diffraction-limited spot and the resulting reflected light is measured by OPU 502. An automatic gain control (AGC) system 504 then uses the previously inserted AGC sequence to control the signal strength and bias to protect the ML data against corruption from low-frequency noise. An anti-aliasing filter (not shown) may protect the data from corruption from high-frequency noise. Sync marks detected by sync detector 506 and the accompanying timing recovery detected by timing recovery system 508 protect the data sampling from timing errors. In one embodiment, timing recovery is assisted by using a special sequence to determine a zero time. This sequence consists of a short pseudo-noise sequence that has a well-behaved auto-correlation property. This property of the sequence is used to precisely locate the beginning of a data block adjacent to the sequence.

Ideally, a write compensation system causes an output from the read channel front-end such that a subsequent equalizer can remove all the remaining linear ISI. In one embodiment, the data from the read channel front-end are sent to an adaptive fractionally-spaced-equalizer (FSE) during normal operation which removes all linear ISI before sending the data to the de-formatter and decoder. In other embodiments, other types of equalizers are used. The FSE takes the data sampled at twice the mark rate and equalizes them to a "memory-less" (no ISI) channel. The equalization is performed by an N_tap asymmetric finite-impulse-response (FIR) filter, whose taps are adapted by a tap-update-processor (TUP). These filter taps are specified at the sample rate, which is half the output, or mark rate. The FSE takes its data input from the reader front-end by way of a FIFO buffer. The FIFO is filled by the reader, and the FSE starts extracting from the FIFO when the TUP is finished. The updates to the filter taps are calculated by the TUP using an adaptation sequence that is part of the data format. Note that the write compensation system receives its input from the reader front-end and not from the output of the equalizer.

Channel Model

The data generator sends data to the write strategy calculator (WSC) in two parallel pathways: 1) Passing through the physical channel (writer and reader), and 2) Passing through a mathematical model of the channel. The purpose of the write strategy calculator is to make the output of these two pathways match by adjusting the elements of the WSM (which contains the precise laser control instructions for creating ML marks). The channel model provides a target for the write strategy calculator that makes the relationship between the input data and recovered output simple and as well-behaved as possible.

There are two types of channel models considered in detail here: 1) Fixed models and 2) Dynamic models. Fixed models of the channel do not change during the write compensation procedure and do not need additional information from the write strategy calculator. Dynamic models change during the write compensation procedure based on information provided by the write strategy calculator. In one embodiment, the channel model is linear and dynamic. Other dynamic channel models can be either linear or nonlinear.

Two choices for the fixed channel models include the "1+D" model and the "1+αD+D²" model, where D is the delay operator and α is a fixed constant. These model choices have applications in the design of band-limited channels where a controlled amount of ISI is desired. The ability to shape the channel with write compensation such that the channel has a controlled amount of ISI is particularly useful when used with Viterbi detection in Partial Response Maximum Likelihood (PRML) reception. These channel models are relatively simple to implement and calculate. More complicated linear models include the "matched filter" model which shapes the data such that the system SNR is a constant value at all frequencies, and a "best-fit" model which shapes the data with a linear filter that is closest to the physical channel output in the least-squared-error sense.

Dynamic models may be either constrained or general. An example of a constrained dynamic model is the "1+αD+D²" model where α is a parameter that may vary during the write compensation procedure. The write compensation procedure begins with an initial guess for the WSM. The data are then written and recovered. A new value of the parameter α is calculated such that the channel model $1+\alpha D+D^2$ minimizes the summed-squared difference between the channel model output and the physical channel output. This new value of the channel model parameter is fed back to the channel model for the WSM update computation. The recovered data are then compared to the channel model using the new value of ?? and an update to the WSM is computed.

A general linear dynamic model is similar to the above constrained dynamic model but without the forced constraints on the structure of the linear filter. In a system with an adaptive equalizer, is it more important to shape the channel to be linear than to shape the channel to a particular linear target. Linear distortions of the data are removed by the equalizer, while nonlinear distortions are not.

As in the above example, the write compensation procedure begins with an initial guess for the WSM, with which a type-II test pattern is written and recovered. A new set of taps for the channel model's FIR filter is calculated such that the new filter coefficients (i.e. kernels $h_0$ and $h_1(\tau)$) minimize the summed squared difference between the channel model output and the physical channel output. This new set of tap values is fed back to the channel model for the computation of the update to the WSM elements. The difference between the recovered data and the new channel model is calculated and the resulting error sequence is used to update the elements of the WSM. If the summed-squared difference between the recovered data and the channel model is not less than a specified error value, the procedure iterates beginning with a write of the type-II test pattern using the updated WSM.

In one embodiment, an adaptive FSE is included between the reader front-end and the decoder. The equalization is performed by a multiple tap finite-impulse-response (FIR) filter, whose taps are adapted by a tap-update-processor (TUP). As a result, the number of filter taps available to restore the original data is constrained. If the channel model contains more taps or complexity than the FSE then it is possible to create a condition where an inverse filter cannot be constructed to undo the effective linear transform performed by the system on the original data.

In other embodiments, it is desirable to have a controlled amount of ISI for PRML reception. In such an application of the write compensation system, particular forms of the target (e.g. 1+D or 1+αD+D²) are desired.

Write Strategy Calculator

The write strategy calculator determines set write strategy parameters that correspond to input data subsequences. The write strategy parameters determine laser control instructions such that the relationship between the input data sequence and the recovered data is close to the specified target. As mentioned above, the target may be either fixed or dynamic. In addition to this function, the write strategy calculator must perform a number of supporting operations including WSM initialization, data alignment, and determining when and how to exit the write compensation procedure.

The write strategy calculator receives data from two sources: 1) The reader output and 2) The channel model output. The correspondence and alignment of these two data sequences is determined by the write strategy calculator in one of the first data processing steps of the write compensation procedure. The write strategy calculator also transmits data back to two sources: 1) The WSM and 2) The channel model.

FIG. 6A is a diagram illustrating in further detail write strategy calculator 214 shown in FIG. 2. The write strategy calculator begins the write compensation procedure by initializing the WSM and channel model. After initialization is complete, data (of type-II pattern) are recorded. Data from the two sources (reader and model) are then loaded into a buffer 602 and pattern aligner 604 aligns the two sequences such that their cross-correlation is peaked with zero delay. In other embodiments, a large buffer is not used and the data alignment is performed by synchronizing the channel model output with the reader output by triggering on "start-of-pattern" formatting sequence. Once the target and recovered data are aligned, the difference between the two sequences is calculated by Error Calculator 606 and fed to WSM Updater 608. WSM updater 608 uses the resulting error sequence to compute new WSM elements that minimize the error. Once the error is less than a specified value, the write compensation procedure terminates. In a system with a dynamic channel, the output of Pattern aligner 604 is also input to a Target channel model updater 610. Target channel model updater 610 updates the target channel model within the constraints imposed on the target channel model to decrease the difference between the read signal and the target channel model. In some embodiments, the difference calculated by Error Calculator 606 is input to target channel model updater 610 so that it is used both by the WSM updater and the channel model updater.

FIG. 6D is a sample contour plot illustrating systematic signal error for a level 3 symbol as a function of its two nearest neighbors before and after precompensation. As the write strategy calculator updates the WSM, the total error is decreased and the distribution of the error is flattened.

In the study of numerical methods, algorithms are generally classified as direct or iterative. In one embodiment, the method of computing a final WSM is a combination of direct and iterative methods in that it is an iterative improvement to a direct calculation. The direct calculation is discussed in the initialization section, and the iterative calculation is discussed in the subsequent iteration and control section.

In the following discussion of WSM initialization methods, three methods named: "Diagonal", "Software-Iteration", and "Pre-existing" are presented. Each method differs in the test pattern used in the initialization calculation as well as the algorithm. The generation of the "Diagonal WSM" uses type-I test patterns, the "Software Iteration WSM" uses type-II test patterns, and the "Pre-existing WSM" uses no test pattern (because it is based on scaling a pre-determined WSM). The initialization process influences how fast the write compensation procedure converges. If the initial WSM is close to the final WSM, the procedure converges faster.

In a multi-level recording system using M multiple levels of reflectivity to encode information, the WSM initialization includes picking an initial set of M target levels and the coupled write strategy parameters. Two criteria that may be used to place the target levels are:
1) Equally-spaced level criteria, or "ELC" and
2) Constant Discriminability Criteria, or "CDC".

In different embodiments, these criteria or combinations of these criteria are used. Other criteria may also be used in other embodiments.

The CDC level placement strategy uses measurements of both the average and variance of the mark reflectivity. The shape of the nonlinear curve in FIG. 6B is typical of the response of recording media used in several embodiments. The solid curve plots average reflectivity as a function of a write strategy parameter. The four points labeled A-D represent four possible level placements. The variance of the level reflectivity for each of these four points is represented by the probability distributions on the right side of the plot. The initial set of levels are chosen based on the measurement of the relationship between the mark reflectivity and the write strategy parameters as well as the variance of the sampled reflectivity.

Once the relationship between the write strategy parameter and the reflectivity is measured, the maximum and minimum values of reflectivity are determined (points $R_{max}$ and $R_{min}$.) Two new points X and Y are defined by moving up from the minimum reflectivity (point Y) and down from the maximum reflectivity (point X) by a small fraction (in one embodiment about 10%) of the full dynamic range ($R_{max}-R_{min}$). A "working" dynamic range $DR_w$ is defined by these two new points: $DR_w=X-Y$. This working dynamic range is smaller than the full DR ($R_{max}-R_{min}$) to allow the write compensation procedure to adjust the points of maximum and minimum reflectivity either up or down.

The criteria for placing the levels such that the difference between neighboring levels m and n are constant ($\Delta L_{mn}$=constant) is named ELC, or Equally-spaced Level Criteria. The initial level placement is performed by dividing up the working dynamic range into equally spaced reflectivity levels, or $\Delta L_{mn}$=constant. Because the relationship between reflectivity and write strategy parameter is generally nonlinear, spacing the levels of reflectivity equally usually results in non-equally spaced write strategy parameters. An example of four equally spaced levels and their associated level distributions is shown in FIG. 6B.

The criteria for placing the levels such that the errors made discriminating between all neighboring levels is equal is named CDC, or Constant Discriminability Criteria. The criteria assumes that the level distribution is approximately Gaussian with standard deviation $\sigma_m$ and places the levels $L_m$ such that the difference between neighboring mean levels $\Delta L_{mn}=L_m-L_n$ satisfies equation (2) below.

$$\Delta L_{mn}/\sqrt{(\sigma_m^2+\sigma_n^2)/2}=\text{const} \quad (2)$$

The upper and lower most levels are chosen to span the full working dynamic range. With this criteria, the overlap of the tails of all neighboring Gaussian level distributions are equal. Because the overlap of the distributions corresponds to errors an optimal level discriminator would make, the total number of errors can be minimized by adjusting the placement of the average levels such that the overlap from all neighboring level distributions are of equal amount.

Figure 7:
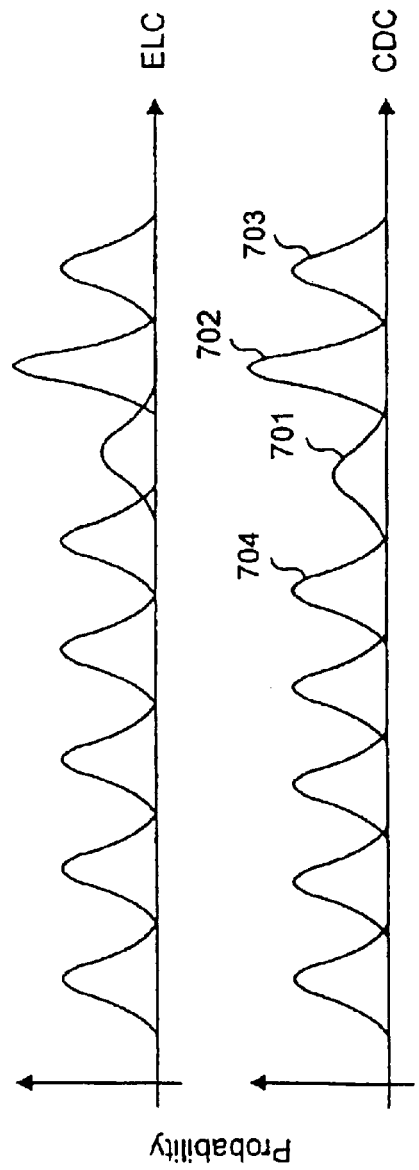
FIG. 7 illustrates an 8-level system where there is one narrow and one wide distribution.

FIG. 7 illustrates an 8-level system where there is one narrow and one wide distribution. Both ELC and CDC levels are shown. The total number of symbol errors that would be made for such a signal set is represented by the total overlap of all the distributions. The total overlap can be reduced by placing the levels according to equation (2) above. When the levels are so placed, levels 701 and 703 that neighbor narrow distribution 702 are shifted toward narrow distribution 702 and levels 702 and 704 that neighbor broad distribution 701 are shifted away from broad distribution 701.

Once the CDC levels are determined, a level placement matrix (LPM) is constructed. During the write compensation procedure, the LPM functions as a look-up table that converts the integer test patterns into new target values for input to the channel model. Note that the LPM for ELC level placement represents a simple linear relationship.

In one embodiment, the initial WSM is determined using reflectivity measurements of a type-I test pattern containing a series of repeated marks. In the context of a WSM index length of three, the "Diagonal WSM" gets its name because an arbitrary element (i, j, k) in the WSM is approximated by the "diagonal" term (j, j, j). In this embodiment, the type-I staircase pattern is recorded and read back many times in order to gain a good estimate of both the mean and variance of the reader signal. Because the repeated marks of the type-I patterns correspond to "diagonal" elements (j, j, j) of the WSM, these elements of the WSM are the ones most closely represented by this method. Arbitrary elements (i, j, k) of the WSM are then approximated with their nearest diagonal element, (j, j, j).

In the type-I pattern, each "stair step" corresponds to multiple sequential marks created with identical write strategy parameters. The length of each sequence of identical marks is long enough such that sampling the middle of this sequence has almost no dependence on the neighboring steps. The range of the WS parameters used to create the different stair steps is chosen to extend beyond the range anticipated for encoding actual data. This is done to allow good definition of the points of saturation. As shown in FIGS. 6B and 6C, the working dynamic range is defined by reducing somewhat the full dynamic range detected during initialization.

After the staircase pattern is read, the data are synchronized and re-sampled to eliminate effects of read speed variability, and re-scaled to compensate for any slowly varying amplitude shifts. Different repetitions of the pattern are averaged to produce a relationship of the reflectivity mean and variance as a function of WS parameter value similar to FIG. 6B. If a particular reflectivity level choice for either initial level placement method ELC, or CDC is not directly sampled by the type-I pattern, the expected mean and variance values are interpolated using neighboring points.

It is worth noting that type-I patterns produce a reader signal that resembles a "staircase". When viewed on an analog scope, these test patterns dwell on a series of level values for a time that is much longer than the time it takes to transition to the next level. As a result, the persistence time of the oscilloscope features the level plateaus and dims the transitions. The result is multi-level version of the well-known EFM "eye-diagram". This ML eye diagram provides an efficient method of estimating the level placement and variance.

The Software Iteration WSM provides a means for modeling the physical channel through interpolating an expected channel response based on repeated measurements of type-II patterns. As discussed above, these type-II test patterns present all possible combinations of subsequences of multilevel symbols of a certain length. Using this pattern, the mean reflectivity for each index sequence is calculated and stored in the Software Iteration WSM as a coupled element of mean reflectivity and write strategy parameter. Whereas the standard WSM contains only an indexed set of write strategy parameters, the Software Iteration WSM includes in addition to the write strategy parameter, a mean reflectivity for each index sequence.

The Software Iteration WSM can be used as a model of the channel for the purpose of doing further iterations to update the WSM. Since the Software Iteration WSM includes a mean reflectivity for each input subsequence, simulated write and read can be executed by interpolating the indices of the WSM and determining the expected reflectivity. In one embodiment, a real write and read is executed for the purpose of updating the Software Iteration WSM and then the Software Iteration WSM is used to execute one or more simulated writes and reads. Another real write and read is then executed to update the Software Iteration WSM. The convergence of the WSM to an acceptable WSM can be quickened significantly by this technique since a simulated write and read using the Software Iteration WSM can be executed faster than a real write and read.

The Software Iteration WSM model differs from the target channel model discussed above. The target channel model is used as the target of the write compensation of the system, and is not necessarily an accurate model of the uncompensated channel. The determination of the WSM attempts to cause the write compensated channel to match the target channel model. In contrast, the Software Iteration WSM model simulates the current behavior of the compensated channel using current WSM values. It allows simulated writes and reads to be executed for the purpose of adjusting the WSM values to cause the compensated channel to more closely conform to the channel target. Simulated writes and reads are combined with real writes and reads in a manner that causes the WSM to converge to an acceptable WSM in an efficient manner.

When a type-II test pattern is passed through both the channel model and the Software Iteration WSM, the difference between these two signals is used to generate an update to the write strategy parameters of the Software Iteration WSM. Based on the changes made to the write strategy parameters, the associated reflectivity values are interpolated to a new set of expected reflectivity values. This procedure iterates until the mean-squared-difference between the channel model and the Software Iteration WSM is less than a specified value.

The write compensation procedure using the Software Iteration WSM is thus similar to the procedure using the standard-WSM. Instead of writing and reading out a test pattern to the storage system for every iteration, the Software Iteration WSM is re-interpolated to list the new set of write strategy parameters. In this way, writing to and reading from the storage system is replaced by interpolation of the Software Iteration WSM.

A pre-existing WSM is the result of a converged iteration procedure. By using a pre-existing WSM as a starting point for iterations, the convergence process may be shortened. If it is determined that an overall system change has occurred in the system, the pre-existing WSM can be re-scaled or re-interpolated to compensate for the change in the system. Examples of systematic changes include changing or optimizing the dynamic range, changing writing laser power, changing spot size (i.e. de-focus), or changing media type.

The write strategy calculator (write strategy calculator) is made from four "sub-calculators": 1) Pattern aligner, 2) Channel model updater, 3) Error calculator, and 4) WSM updater. The write strategy calculator receives data from both the channel model and the read channel and it sends data to both the channel model and the write channel.

In one embodiment, the write strategy calculator receives simultaneous type-II pattern data from both the channel model and the read channel output and stores these data streams in separate buffers. In other embodiments, the output of an "Software Iteration WSM" may substitute for the read channel source. The start of the type-II pattern is marked in each buffer by a pointer and passed to the channel model calculator. If necessary, the channel model is updated, the buffer pointers are reset, and the pointers to the beginning of buffer A and B are sent to the error calculator. The output of the error calculator is a matrix of average differences between the target and recovered value for each n-tuplet (usually triplets). This error matrix is then passed to the WSM updater which calculates new write strategy parameters.

In other embodiments that utilize a fixed channel model, other pattern alignment and memory management methods may be used to generate the error matrix. For example, the buffers described above may be replaced by FIFO buffers of length n_index (usually three) by synchronizing the output of the channel model with the read channel output. This synchronization may be performed by detecting a special timing sequence such as the TZL sequence that locates the beginning of the pattern. Once detected, the FIFO buffers are filled and the error calculation is instructed to begin. The error for each n-tuplet (usually a triplet) is then directly accumulated into the error matrix.

In one embodiment, the entire formatted type-II pattern is passed through the level placement matrix (LPM) and loaded into a buffer_A. Because the type-II pattern is internally generated, a pointer to the beginning of the type-II pattern in buffer_A can be set by construction. The sampled output of the read-channel front end is then loaded into buffer_B. In some embodiments, the read data may be sampled at a rate other that the data cell frequency. In such a case, the size of buffer_B is scaled accordingly. A pointer into buffer_B is subsequently set to point to the beginning of the type_II pattern by locating a timing-zero-locator (TZL) sequence. As discussed above, this sequence is a pseudo-random sequence that can be used by a circuit or algorithm to locate the beginning of a formatted block of data containing the type-II pattern. In other embodiments, the output of an "Software Iteration WSM" may substitute for the read channel source.

In one embodiment, buffer_B is Q times the length of buffer_A, where Q is the number of times the type-II sequence repeats. In the context of a write compensation system using triplets (n_index=3), different repeat lengths Q are used depending on the structure of the type-II sequence. For 8×3 sequence, a Q between 10 and 100 is sufficient, for an 8×5 sequence a Q between 1 and 10 is sufficient. The value Q is less for the 8×5 sequence because the next-nearest neighbors can be averaged over to contribute to a better estimate of the triplet.

At the completion of the alignment locator step: 1) Buffer A is full of type-II data that has been re-mapped by the LPM, 2) Buffer_B is full of sampled read-channel data (or "Software Iteration WSM" data) and 3) Pointers to the beginning of the type-II pattern for both buffers A and B have been located and set.

The output of the pattern aligner (pointers to the beginning of the patterns in each of the filled buffers A and B) forms the input to the channel model updater. Upon entry into the channel model updater, the associated channel model parameters are loaded (e.g. number and values of the initial filter taps). The type of channel model (fixed or dynamic) determines the type of parameters that are loaded.

No update to the channel model is necessary for fixed channel models, so the buffer_C containing the channel's target values is simply filled.

In one embodiment, a dynamic channel model consists of a n_tap FIR filter (i.e. kernels $h_0$ and $h_1(\tau)$ in equation (1)). The kernels (or set of taps) are calculated such that the new filter coefficients operating on the symbol set in buffer_A minimize the summed-squared difference between the channel model output and the physical channel output (buffer_B). After the channel model is calculated, buffer_C is then filled with the model values by passing the data from buffer_A through the channel model. Note that if multiple presentations of the type-II pattern are written and read using a fixed channel model, the model (or target) values in buffer_C need only to be loaded once.

At the completion of the channel model updater, an additional buffer_C containing the channel target values is filled and a pointer to the beginning of the pattern in buffer_C is set.

Upon entry into the error calculator block, buffer_B holds the sampled read channel data and buffer_C holds the target data. The input to the error calculator block consists of pointers into buffers B and C that locate the beginning of the type-II pattern.

For each triplet $[x_{n-1}, x_n, x_{n+1}]$, the average difference between the read channel output and the model's target value is accumulated in a write strategy error matrix (WSEM). The average difference between the read channel output and the model's target value is called the systematic error and is given the symbol $e_n$ in the discussion below. The structure of the WSEM is of the same form as the WSM but instead of storing the laser control instruction for each triplet, the systematic error for the center value of the triplet is stored. Note that if multiple presentations of the type-II pattern are loaded into buffer_B, buffer_C is treated as a cyclic buffer.

The input to the WSM updater consists of the WSM, WSEM, and a set of pre-determined parameters. The set of pre-determined parameters include a convergence factor for the iterative procedure and an array containing the average reflectivity as a function of the write strategy parameter (obtained earlier by the initialization block presenting the type-I pattern). This array is used to determine the sensitivity of the reflectivity to the WS parameter.

Through an iterative procedure, one embodiment of the write compensation system updates the laser control instructions in the WSM such that a specific data input results in a recorded output equal to the channel model output. In the context of a write compensation system with n_index=3, the update to the WSM can be represented as:

$$p^{(g+1)}(i,j,k) = p^{(g)}(i,j,k) + \Delta p(i,j,k) \quad (3)$$

where $p^{(g)}(i,j,k)$ is the value of the WS parameter for the triplet $[i,j,k]$ on iteration number g and $\Delta p(i,j,k)$ is the incremental change made to this WS parameter.

There are two primary methods for updating the WSM: 1) sloped-based updates and 2) fixed updates. Three pieces of data are used for updating the WSM using the slope-based method: 1) a convergence factor 2) the media response curve and 3) the WSEM. The convergence factor $\lambda$ (typically in the range of 0.5 to 1.0) is used to regulate the magnitude of the WSM update such that the write compensation procedure converges to a stable value. The media response curve (reflectivity vs. WS parameter) can be obtained from the recording of the type-I pattern presented in the initialization step. Because the write strategy calculator measures the difference between the read channel output and the channel model output in units of reflectivity, the media response curve provides information to the write strategy calculator on how much reflectivity changes when a write strategy parameter is changed a given amount. The derivative of this curve can then be used to calculate the sensitivity $$\frac{\partial r_j}{\partial p_j}$$

of the reflectivity $r_j$ to the WS parameter $p_j$.

The change $\Delta p$ made to WS parameter $p(i,j,k)$ is estimated from equation (4) below:

$$\Delta p(i,j,k) \cong \lambda \frac{e(i,j,k)}{\left(\frac{\partial r_j}{\partial p_j}\right)} \quad (4)$$

where the error in reflectivity $e_n$ between the read channel output and the channel model output is obtained from the WSEM.

In one embodiment, a single convergence factor $\lambda$ is used for all elements of the WSM. In another embodiment, different convergence factors $\lambda$ (or equivalently, different estimates $$\frac{\partial r_j}{\partial p_j}$$

for the sensitivity of the reflectivity curve) may be used for different elements of the WSM.

In one embodiment, the dynamic range of the signal can be held constant by holding constant the write strategies corresponding to triplets (0, 0, 0) and (M−1, M−1, M−1). This may be accomplished by estimating the change $\Delta p$ made to WS parameter $p(i,j,k)$ from equation (5) below:

$$\Delta p(i,j,k) \cong \frac{\lambda}{\left(\frac{\partial r_j}{\partial p_j}\right)} \Big\{ e(i,j,k) - \quad (5)$$

$$e(0,0,0) \frac{[h_1(M-1-i) + h_2(M-1-j) + h_3(M-1-k)]}{[h_1(M-1) + h_2(M-1) + h_3(M-1)]} -$$

$$e(M-1, M-1, M-1) \frac{[h_1 i + h_2 j + h_3 k]}{[h_1(M-1) + h_2(M-1) + h_3(M-1)]} \Big\}$$

where $\{h_1, h_2, h_3\}$ represent linear filter coefficients derived from the channel model 210.

In another embodiment, the WSM may be updated using a small but fixed size $\Delta p$. Three pieces of data are needed prior to updating the WSM with this method: 1) The sign of $$\frac{\partial r_j}{\partial p_j},$$

the sign of the WSEM elements, and the size of the update step $\Delta p$. The direction of the step $\Delta p$ is determined from the WSEM and the media response curve. The change made to WS parameter $p(i,j,k)$ is thus $$\left[\Delta p * \text{sign}(e_n) * \text{sign}\left(\frac{\partial r_j}{\partial p_j}\right)\right].$$

In other embodiments the size of the step $\Delta p$ may be varied from iteration to iteration such that the first iteration uses a larger step size than the subsequent iterations. Varying the step size as a function of the iteration number typically reduces the number of iterations necessary. However, compared to the above slope-based method, many more iterations are typically required to converge to a final WSM.

If the speed of reading and writing from the disc is the rate-limiting step for the write compensation procedure (vs. calculation speed in RAM), the speed of convergence can be improved by writing out multiple test patterns calculated using different convergence factors. In one embodiment, several values for $\lambda$ (such as 0, 0.5, 0.75, and 1) are tried in parallel during each iteration, and the value which produces the lowest root-mean-square systematic error is used as the starting point for the subsequent iteration.

In one embodiment, if the summed-squared error of the WSEM is less than a specified threshold value, the write strategy calculator exits the write compensation procedure with a final WSM. If a large number of iterations occur with no procedure exit, an error is indicated and a recovery strategy is executed.

Write Compensation Procedure

Figure 8A:
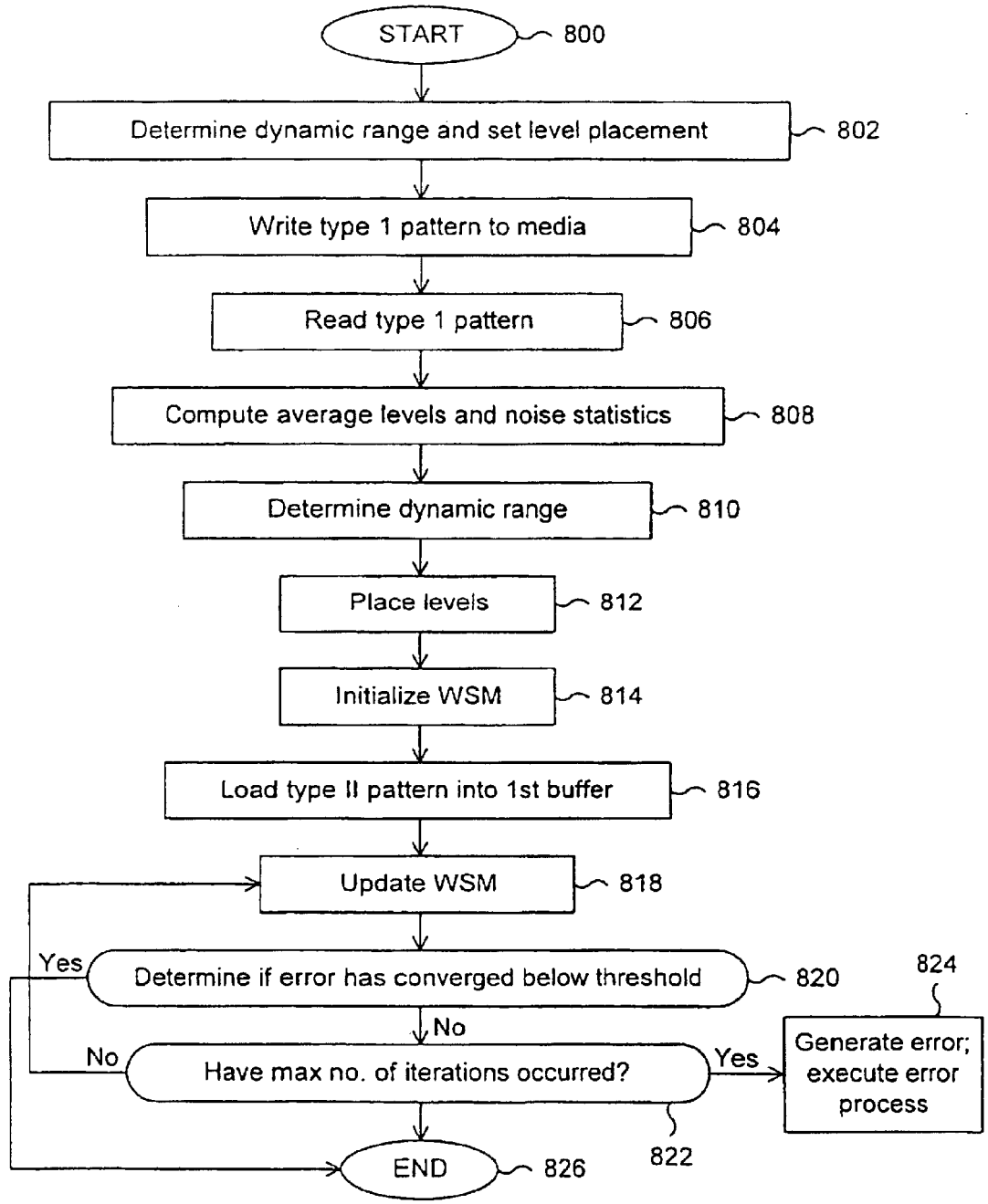
Figure 8B:
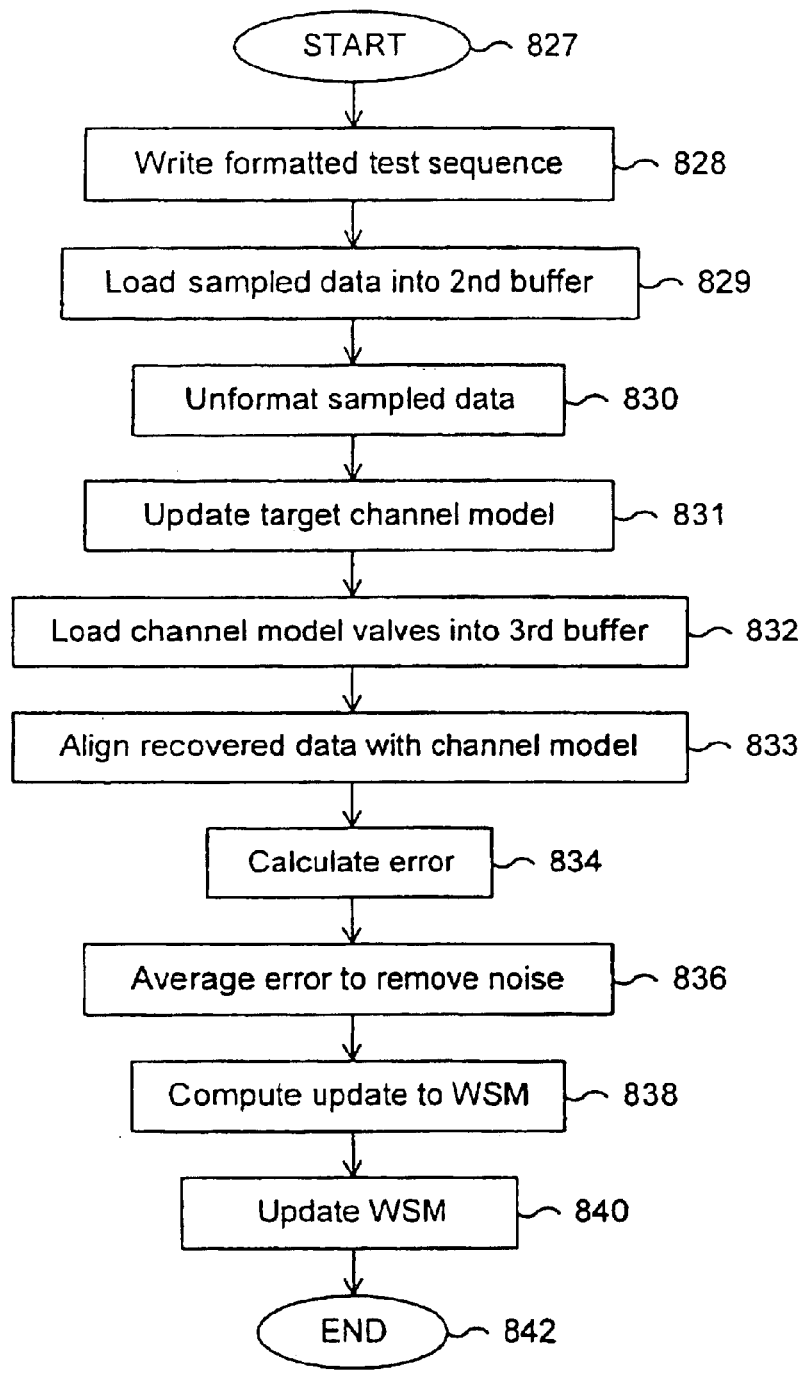

FIGS. 8A–8C illustrate the write compensation process used in one embodiment and described in detail above. FIG. 8A is a flow chart illustrating the process for initializing the WSM using a type I pattern and preparing to update the WSM using a type II pattern. The process starts at 800. In a step 802, the dynamic range of the system is determined and level placement is set. Static nonlinear noise may also be removed in this step.

In a step 804, a type I pattern is written to the media. The pattern is read and aligned in a step 806. Average levels and noise statistics are computed in a step 808. The dynamic range is identified in a step 810. In a step 812, levels are placed according to a level placement scheme such as ELC or CDC. The WSM is initialized in a step 814. In an embodiment where a slope based update is used, the slope of the media response curve is calculated and a convergence factor is determined. Next, in a step 816, a type-II pattern is loaded into a first buffer and the start of the type-II pattern in the first buffer is located. At this point, the system is ready to update to the WSM in step 818, which is described further in FIG. 8B.

Once the WSM is updated, it is determined whether the process has converged so that the error is below a threshold selected for the purpose of defining an acceptable error and allowing the iterations to end. If the error is not below the threshold, then control is transferred to a step 822 where it is determined whether the maximum number iterations have occurred. If not, then further iterations are executed until the process converges to an error that is less than the threshold. If the maximum number of iterations are executed without reducing the error below the threshold, then an error signal is generated in a step 824 and a process may be executed to attempt to recover from the failure.

FIG. 8B is a flow chart illustrating in further detail updating the WSM. A formatted test sequence is written in a step 828. Sampled data output from the read channel front end is loaded into a second buffer in a step 829. The sampled data are unformatted in a step 830 and the target channel model is updated in a step 831. As mentioned above, the channel model is a linear channel model in one embodiment and the linear channel model can be either fixed or dynamic.

Channel model values are loaded into a third buffer in a step 832. If a fixed channel model is used, then this need only be done once. The recovered data are aligned with the channel model in a step 833. In one embodiment, the pattern is stored, rather than generated dynamically by a shift-register. Recovered data are matched to the stored data, after the start-up formatting is removed. The start of the type-II pattern is located in the second by locating the timing-zero locator sequence (TZL) sequence.

In a step 834, the channel model output is subtracted from the recovered samples to obtain a remaining systematic error (plus noise). The error is averaged over a number of triplets to remove noise in a step 836. The update to the WSM is computed in a step 838. Computing the update in a fixed size update system includes simply determining a sign or direction for the update step. If a slope update method is used, then the update is computed based on the measured slope and convergence factor. In some embodiments, parallel updates may be computed and it is determined which update is the best at a later time. In a step 840, the WSM is updated. The process ends at 842.

A system and method for write compensating have been described. Write compensation causes the output of the channel to conform to a target channel model within some measure of error. The target channel model may be static or dynamic, with various constraints being defined for dynamic channel models. One preferred constraint is that the target channel model be linear. Conforming the compensated channel output to a linear channel allows the channel output to be equalized properly. Write compensation is accomplished using a WSM that maps input subsequences to one or more write strategy parameters. The WSM is adjusted by writing type II data to the storage media, reading the data from the media, and calculating the difference between the read data and the type II data transformed by the target channel model.

Other write strategy parameters or measures of the effectiveness of the write strategy may be optimized using a WSM as described above. For example, signal dynamic range can be optimized as part of the write strategy update process. Although an optical data storage channel has been described in detail, the present invention is also applicable to other types of storage channels as well as general communications channels that do not include storage.

Write strategy optimization procedures which are similar in many ways to those described above may also be applied to recording and/or communication signals that are modulated with methods other than multi-level modulation. In one embodiment, a matrix is derived using techniques similar to those described above to optimize the performance of communication and storage channels where read signal threshold crossing times are interpreted to decode a data stream. This is common in optical communication and optical storage systems, and finds application is some magnetic data storage environments as well.

In an optical data storage embodiment described in detail below, binary data are encoded as alternating regions of high and low reflectivity on a substrate such as an optical disk. Reliable optical disk playability and interchange requires that the timing of transitions between areas of high reflectivity and areas of low reflectivity be precisely placed within a detection window during the read process. Jitter and asymmetry are two common parameters that characterize the placement of these transitions. As recording speeds increase and margins decrease, keeping the values of jitter to a minimum and asymmetry near a particular target value is important for optimum system performance. The write compensation procedure disclosed herein reduces the jitter and controls asymmetry of the recording by compensating for non-linear media response, and the effects of neighboring marks on the particular mark being written and read.

A wide variety of RLL and modulation codes will produce a read signal in which data are encoded as a series of signal threshold crossings. One such coding scheme is known as EFM encoding and will be described in additional detail herein with respect to one embodiment of the invention because this encoding scheme is currently used in many optical data storage systems. EFM encoding is a process by which a series of 8 bit blocks of data are encoded into 14 bit blocks of data separated by 3 merge bits.

With EFM encoding, the transitions from one level of reflectivity to another indicate the presence of a "1" bit in the data stream. For example, the EFM data stream 0001 0000 1001 00 (which represents the eight bit data sequence 0100 0110) may be recorded as the following channel data: a low reflectivity area of three bit extent (000), transition to a high reflectivity area (1), of four bit extent (0000), transition to a low reflectivity area (1) of two bit extent (00), transition to a high reflectivity area (1), of two bit extent (00). The reflectivity differences may, for example, be due to the changes in a light sensitive dye, or may be the result of differences in the crystalline state of the media.

Many embodiments of the invention achieve their objective by placing the reflectivity transitions during the write process such that a read signal will be produced that can be accurately interpreted with a low bit error rate. This is done by referring to a write strategy matrix during the write process, such that the timing of laser pulse edges during the write process are defined with reference to the type of transition (e.g. leading or trailing edge) being written and the distance between the transition being written and neighboring transitions. This process will now be described in detail.

Figure 9:
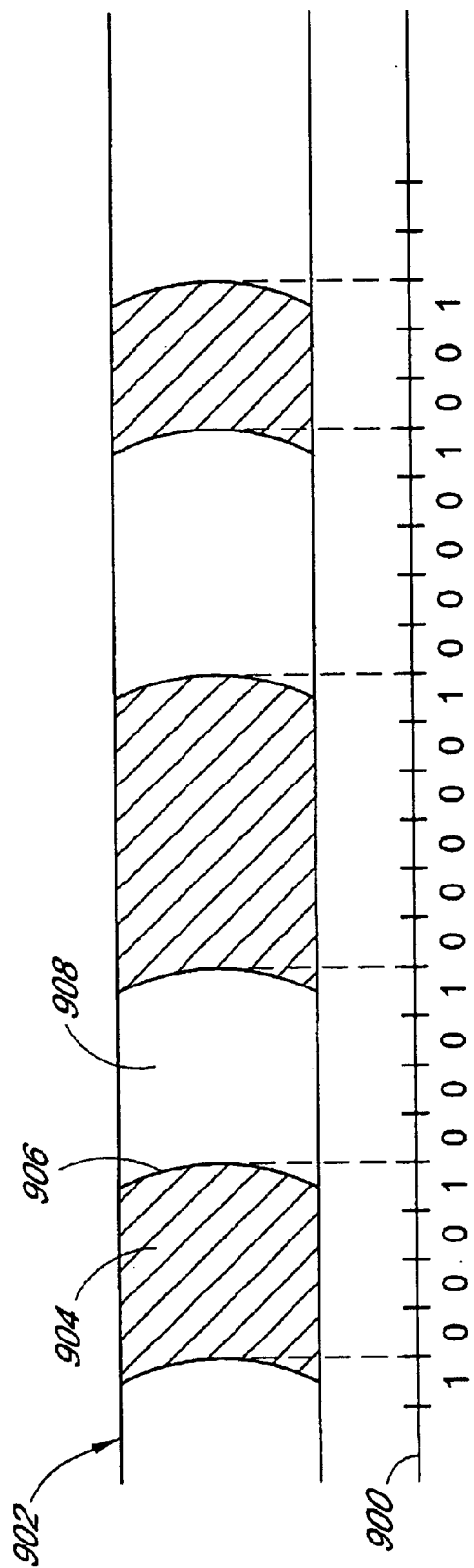
FIG. 9 is a representative illustration of EFM encoded data on a track of an optical data storage medium.

For illustration purposes, FIG. 9 shows a representation of a segment of a storage channel 902 (e.g., a segment of the track on a compact disc) having binary data stored thereon in a pattern of alternating crystalline and amorphous states. It will be appreciated that this is only one example, and that the inventions described herein may advantageously be applied to a wide variety of storage and communication channels. The dark areas of segment 902, such as area 904, represent areas of low reflectivity (e.g., amorphous areas); the white areas, such as area 908, represent areas of high reflectivity (e.g., crystalline areas). For purposes of this discussion, the dark and white areas will be referred to as "marks," and the transitions from one mark to another (e.g., transition 906) may be referred to as "edges." As already explained above, in EFM encoding the edges between marks represent the presence of a "1" bit in the data stream. Thus, the edge 906 between marks 904 and 908 represents a "1" bit, and the mark 908—being four clock units long—represents four bits: three zeros and a one. The axis 900 below storage channel 902 shows the clock units and the bits represented by the sequence of marks recorded on it.

The edges may be produced by changing the state of the write laser, e.g. between an on state and an off state, between different output intensities, or between different pulsing modes, etc. In EFM encoding, the mark lengths are described as being 3T to 11T in length, where a 3T mark refers to a mark encoding three data bits (e.g., 001), and an 8T mark refers to a mark encoding eight data bits (e.g., 00000001), and so on.

Figure 10A:
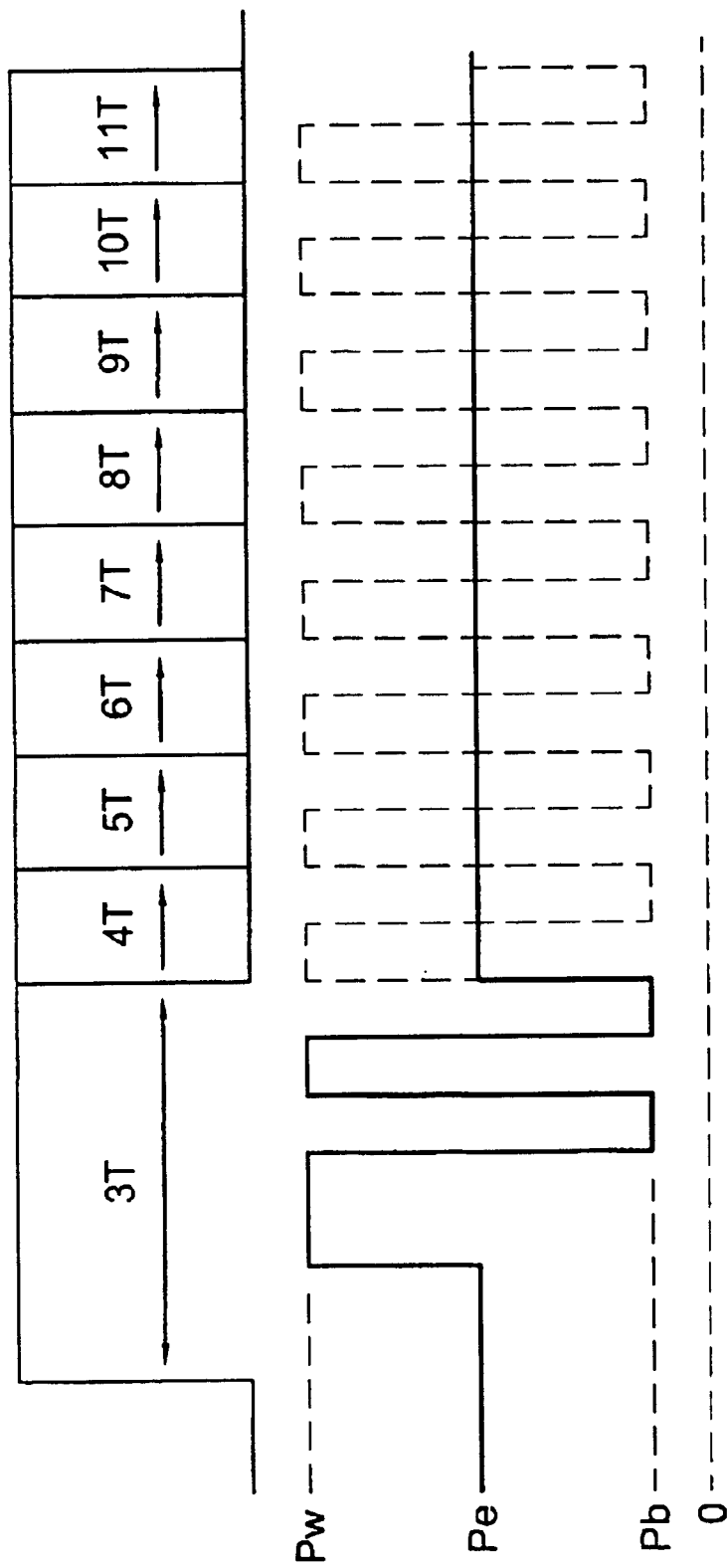
FIG. 10A is a graph of a write laser pulse that may be used to write data onto a CDRW optical media.
Figure 10B:
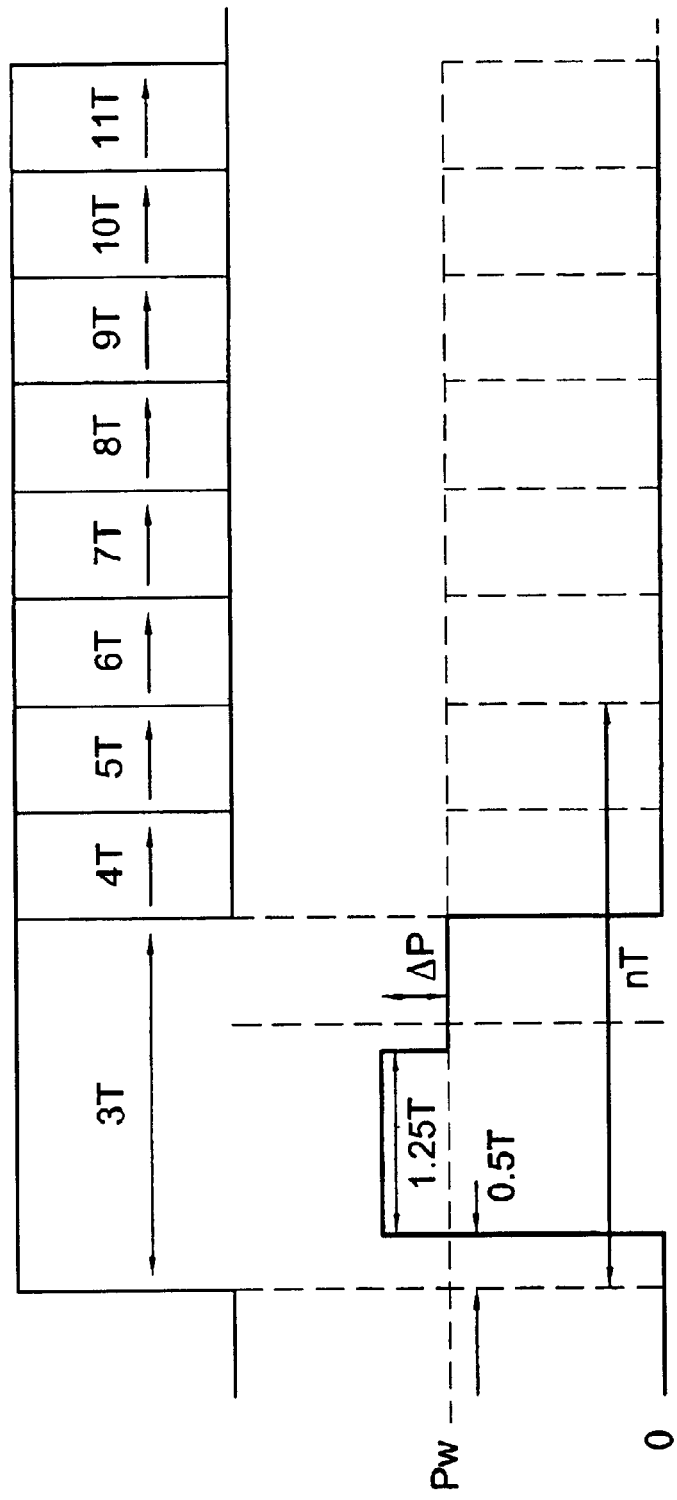
FIG. 10B is a graph of a write laser pulse that may be used to write data onto a CDR optical media.
Figure 10C:
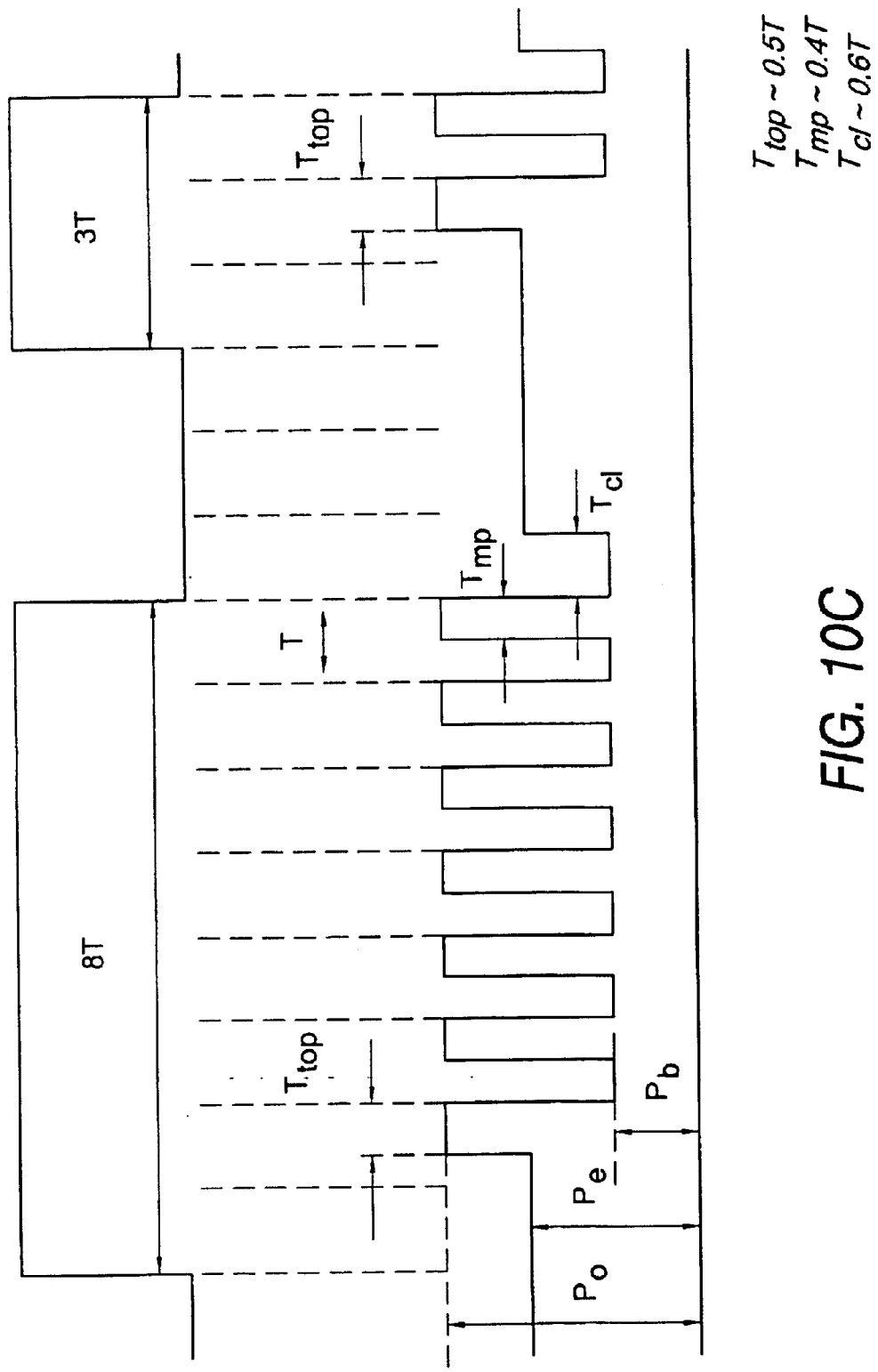
FIG. 10C is a graph of a write laser pulse that may be used to write data onto a DVD-RW optical media.
Figure 10D:
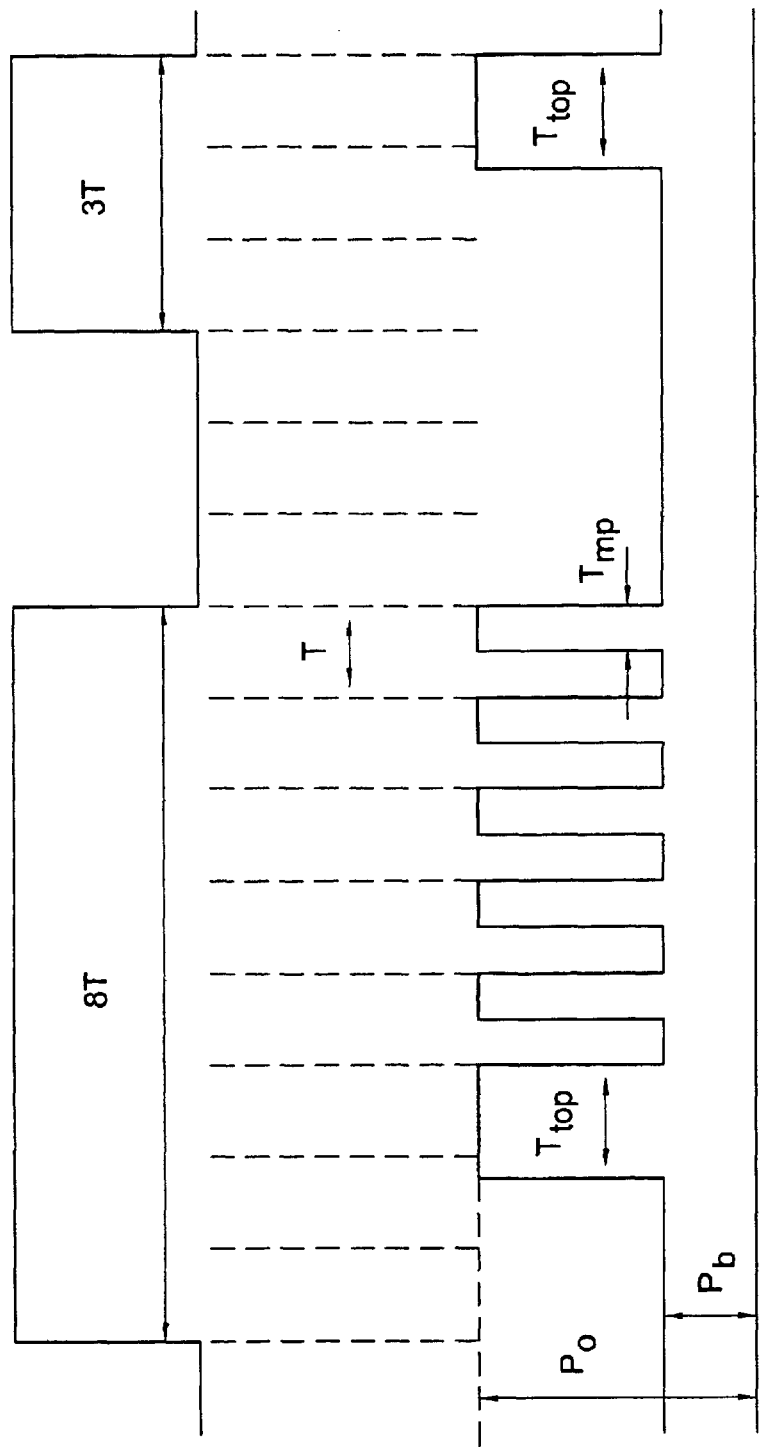
FIG. 10D is a graph of a write laser pulse that may be used to write data onto a DVD-R optical media.

In the optical data storage environment, a wide variety of laser pulse shapes may be used to form the marks and the transitions between them depending, for example, on the media being written to. Several examples are illustrated in FIGS. 10A through 10D. FIG. 10A illustrates a write strategy that has been found useful for CDRW media. This media typically employs a phase change optical encoding material as described above. FIG. 10B illustrates a write strategy that has been found useful for CDR media, which is often based on bleaching embedded organic dyes. FIG. 10C illustrates a write strategy that may be used with DVD-RW disks, and FIG. 10D illustrates a write strategy useful for DVD-R media.

Figure 11:
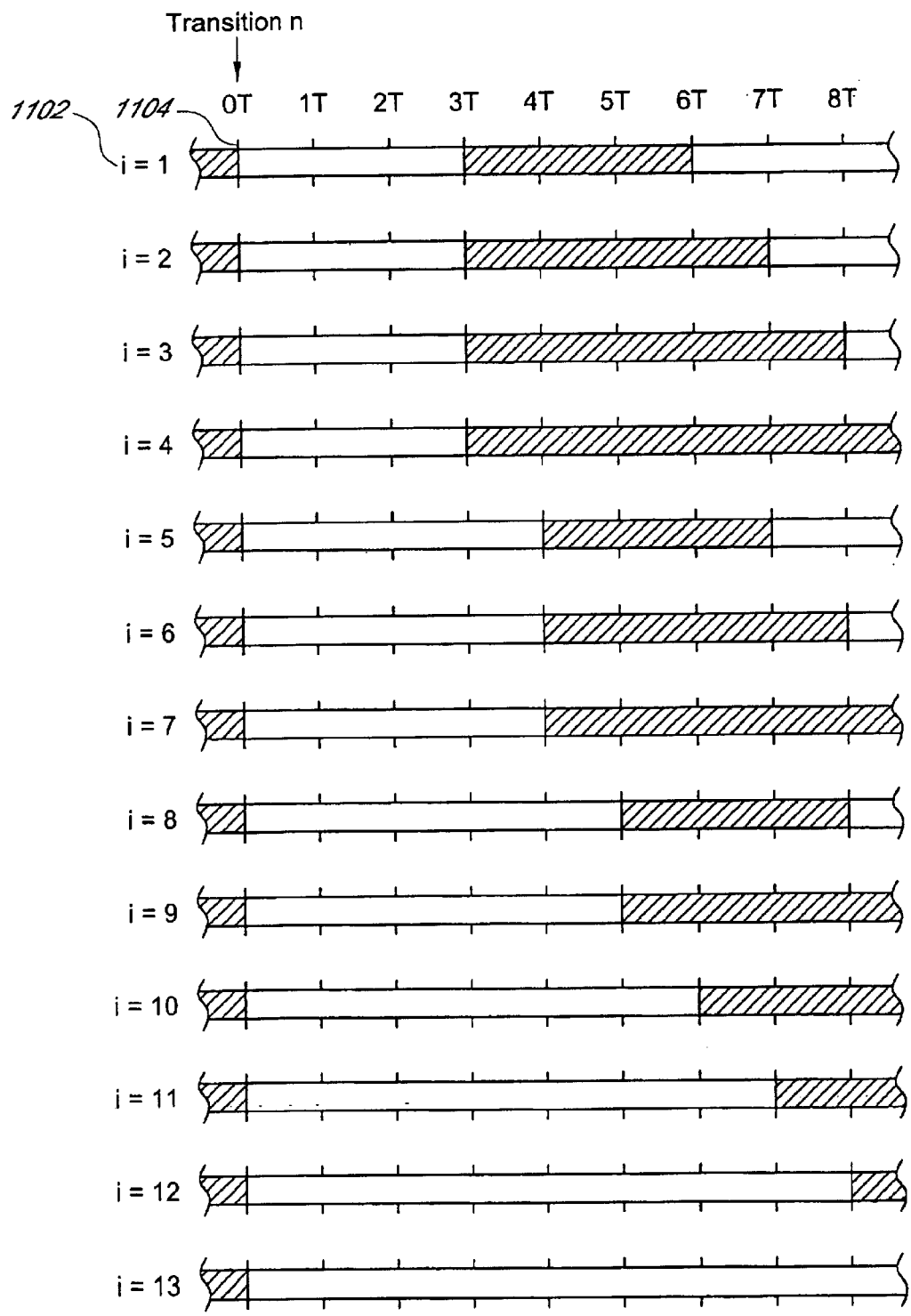
FIG. 11 illustrates the 13 different transition patterns possible in an EFM encoded bit stream within an 8T window on one side of a given transition.

Although the details of the shapes are different for different media, it can be seen that in general a longer pulse or pulse sequence (or a longer gap between pulses or pulse sequences) is used when writing a longer mark to the media. To define the positions of the leading and trailing edges of the pulses/pulse sequences, an index based on a window of channel data specifies an entry in a look-up table that defines the position of the write laser transition relative to the timing clock. This look-up table is called the Write Strategy Matrix (WSM). Before a laser pulse edge occurs during the write process, the WSM is accessed to define the precise placement of the edge relative to the write timing clock. Some embodiments index the transitions based on whether or not the transition is a leading or a trailing pulse edge, and based on the presence or absence of other pulse edges within a pre-defined time period before and after the transition. Indexing based on a time window in this way may be distinguished from indexing methods based on the lengths of the preceding and subsequent marks (as is done, for example, in the system described in U.S. Pat. No. 5,128,921 to Van et al.). It has been found that an index based on a time window rather than what may be termed a data window provides a balance between accuracy and complexity. In one embodiment, the WSM has 338 entries defined by whether or not the transition to be written is a leading or trailing edge and by the characteristics of the transition pattern within a 16T time window centered on the transition to be written (as there are 169 different edge patterns possible in an EFM encoded data stream in a 16T window centered on a transition). This is illustrated in FIG. 11.

Transitions are indexed by the locations of the other transitions within a fixed time interval before and after the transition of interest. In this embodiment, the time window is set to 8T on each side of the transition. (Other window sizes are possible. Furthermore, for DVD applications, the window may be the same physical size, but incorporate more transitions because the marks are smaller.) In a conventional EFM encoding scheme, 13 different patterns of transition locations are possible within 8T of the selected transition. The patterns may be indexed using the variable i and are illustrated in FIG. 11.

| i = 1) 332+ | i = 5) 431+ | i = 9) 53+ | i = 13) 8+ |
|---|---|---|---|
| i = 2) 341+ | i = 6) 44 | i = 10) 62+ | |
| i = 3) 35 | i = 7) 44+ | i = 11) 71+ | |
| i = 4) 35+ | i = 8) 53 | i = 12) 8 | |

The "+" sign should be interpreted as "longer than." For instance, "2+" means "longer than 2T." These thirteen unique patterns result in 338 (=13×13×2) transition types when leading and trailing edges are also distinguished. In this indexing scheme, therefore, a transition may be characterized by an index such as (2, 12, T) to indicate that it has a preceding transition pattern corresponding to i=2 above, a following transition pattern corresponding to i=12 above, and is a trailing edge. FIG. 11 illustrates the transition patterns corresponding to the indices shown above. For example, index i=1 1102 represents a 3T (e.g., crystalline), 3T (e.g., amorphous), longer than 2T (e.g., crystalline) sequence of marks on one side of the edge 1104. FIG. 11 shows that within the 8T window on each side, the number of transitions may be zero (i.e., i=13), one (e.g., i=4, 7, 9–12), or two (e.g., i=1–3, 5, 6, 8).

In this specific embodiment, therefore, the WSM includes 338 entries with each entry corresponding to one of the possible transition types described above. During the write process, the transition type is determined before writing the transition, and the appropriate entry from the WSM is retrieved to control the position of the write laser pulse edge relative to the write clock.

Similar to the multi-level embodiment described above, the write compensation procedure modifies an initial default WSM to optimize the write process and reduce read errors. With this process, the positions of the write laser transitions are adjusted with respect to the write clock so that the threshold crossings in the RF read signal are positioned as close as possible to their expected positions with respect to the read clock. As will be explained in detail below, some implementations of this system involve determining (1) the existing systematic errors in the read signal threshold crossing, and (2) how much the write laser edges should be moved to correct for the detected read signal errors.

FIGS. 12A and 12B are conceptual illustrations of the read signal threshold crossings and their relationship to the edges of the write laser pulses. As used herein and as illustrated in FIGS. 12A and 12B, the notation $w_n$ refers to the nominal length of the mark or space that precedes the write laser transition of interest. Analogously, the notation $w_{n+1}$ refers to the nominal length of the mark or space that follows the write laser transition of interest. The symbol epsilon is used to denote a small shift or perturbation in write laser pulse edge position, either positive or negative. The symbols $j_n^+$ and $j_n^-$ refer to positive and negative shifts in read signal threshold crossing caused by a positive and negative perturbations of the corresponding write laser pulse edge position. $j_{n+1}^+$ and $j_{n+1}^-$ correspond to the subsequent read signal threshold crossing, and $j_{n-1}^+$ and $j_{n-1}^-$ to the previous read signal threshold crossing. As shown in FIG. 12A, delaying the trailing edge laser transition used to produce mark $w_n$ by an amount $\epsilon$ from location 1224 to location 1226 produces a delay in the corresponding read signal transition from position 1230 to position 1232. This movement of the write laser edge position also produces some movement of the adjacent read signal transitions. For example, the previous transition is moved from position 1234 to 1236. The following transition is moved from location 1240 to 1242.

Similarly, read signal transition locations are shifted by advancing the write laser transition edge. This is illustrated in FIG. 12B, where a write laser edge location is advanced from location 1250 to location 1252. As described above with reference to FIG. 12A, this affects the locations of the corresponding read signal transition location as well as adjacent read signal transition locations. In some cases, movement of the next adjacent edges can also be detected.

Figure 13A:
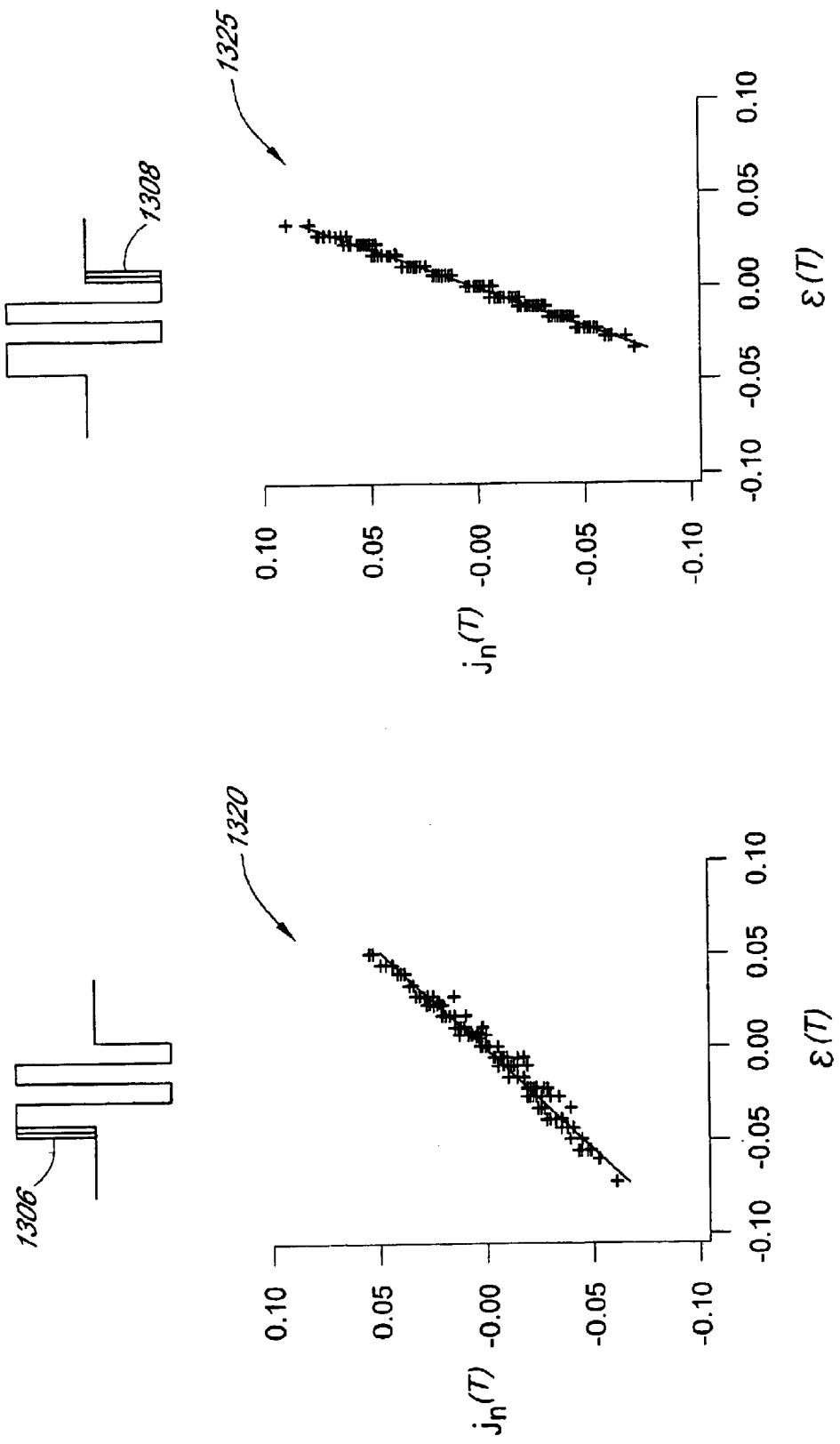
FIGS. 13A and 13B illustrate read back transition shifts as a function of write laser edge position shifts.
Figure 13B:
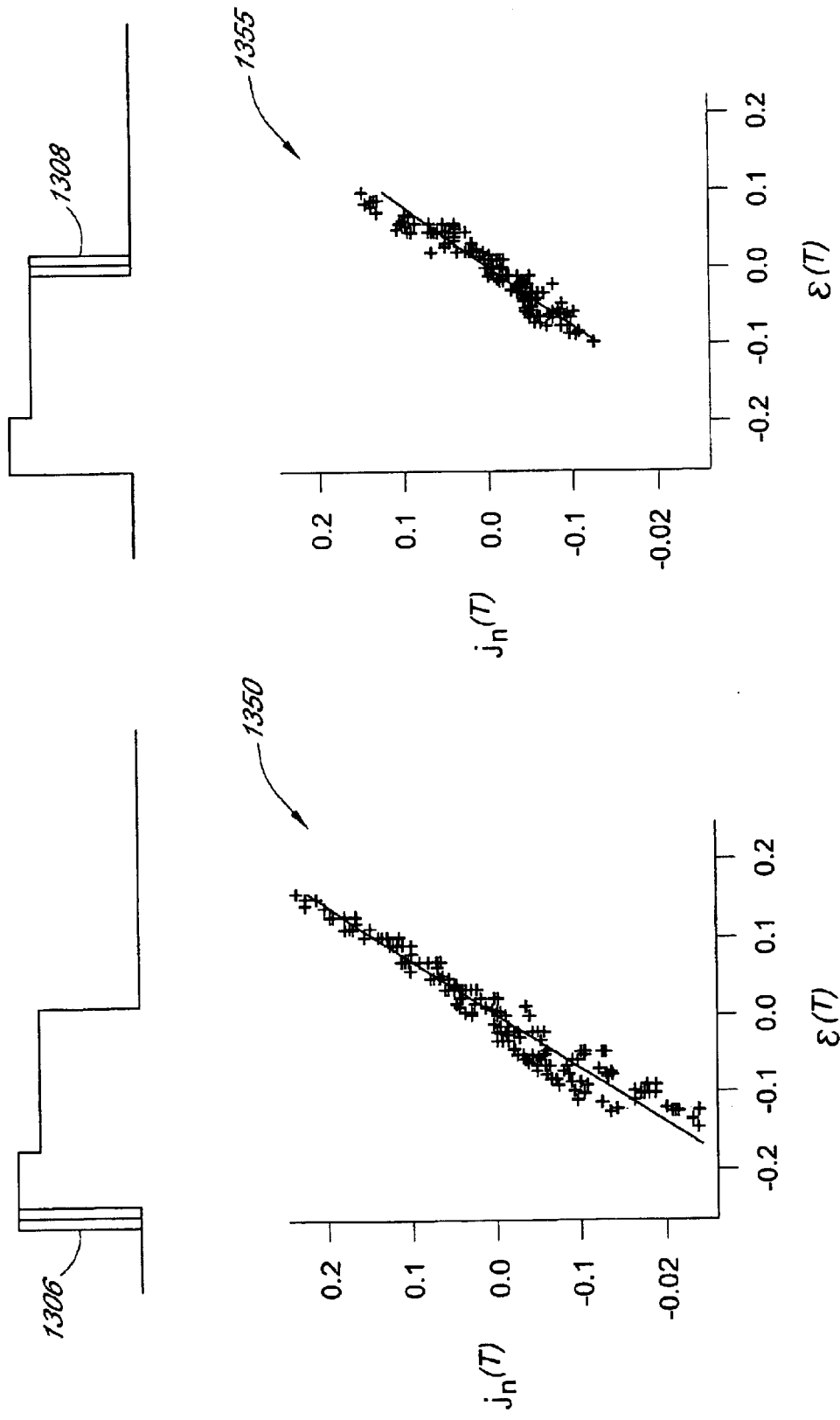

FIGS. 13A and 13B show graphs 1320, 1325, 1350 and 1355 of measurements illustrating the relationship between a movement of a leading edge 1306 or trailing edge 1308 of a recording laser pulse and the resulting movement of the edge of the reflectivity signal measured during the read process. As expected, and as explained above with reference to FIGS. 12A and 12B, perturbing the laser-on or laser-off time perturbs the position of the read back reflectivity transition. As can be observed from the graphs, the response of the reflectivity edge to the movement of an edge in the write strategy (i.e., the edge of the recording laser pulse) depends on whether the moved edge of the recording laser pulse is the leading or trailing edge. The response also depends on the media type. For CDRW media in FIG. 13A, trailing edges are more sensitive than leading edges, as evidenced by their steeper slope. For CDR media as shown in FIG. 13B, both leading edges and trailing edges have slopes close to one, which means that the read back reflectivity transition shifts by about the same amount as the write laser transition time.

Figure 14:
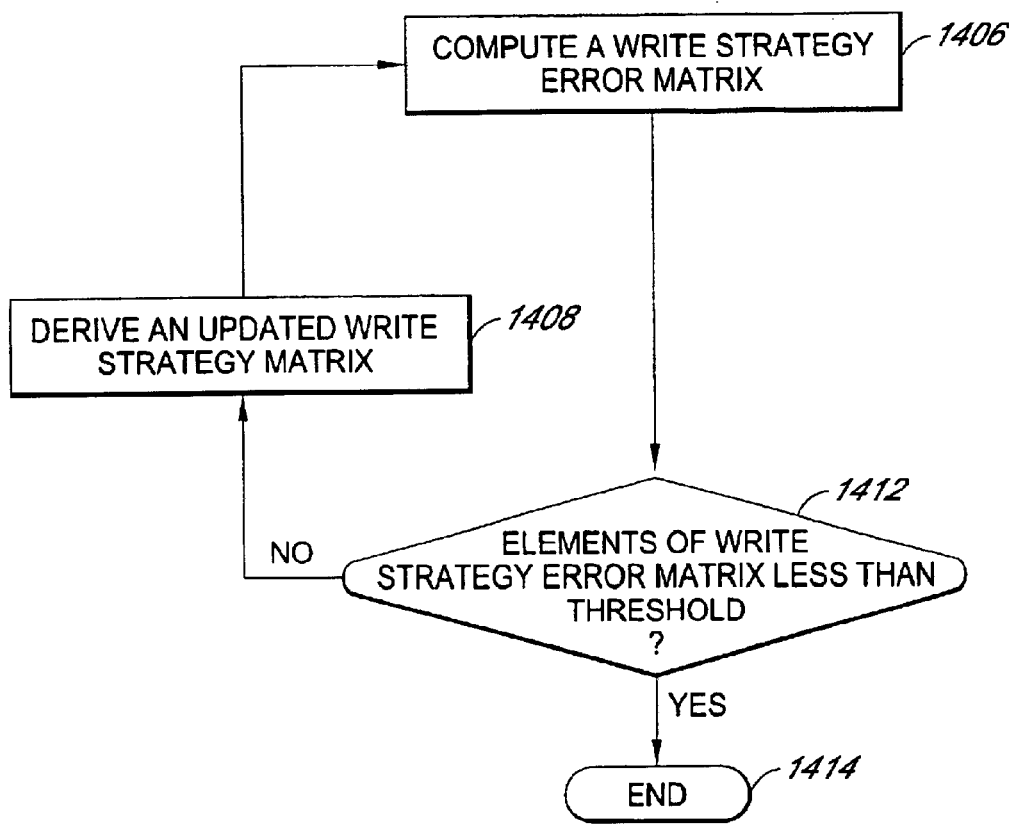
FIG. 14 is a flow chart illustrating a method of computing a write strategy matrix.

FIG. 14 is a flowchart illustrating one embodiment of a write compensation method. Prior to beginning the precompensation process, a default write strategy matrix (WSM) is initially adopted. As described above, the WSM is an indexed set of numbers that specifies, for each write laser transition having a particular index, the appropriate location of the laser transition edge.

The process of FIG. 14 begins at state 1406 wherein a write strategy error matrix (WSEM) is determined. The WSEM, which is described further below with reference to FIG. 17, captures the systematic errors in the read signal threshold crossings that are present when data are written using the existing write strategy matrix. The WSEM is thus an indexed set of numbers specifying, for each transition with a given index, the deviation between the location of the actual measured read signal threshold crossing and the desired ideal location of the read signal threshold crossing. In the absence of timing errors, the elements of the WSEM will be zero.

It is often advantageous to test the efficacy of the current WSM and, if necessary, iteratively perform a WSM revision process. In these embodiments, the process proceeds to state 1412 where it is determined whether the updated WSEM is within an allowable error threshold. If at state 1412 it is determined that the WSEM is not within the allowable error threshold, then the process loops to state 1408 where the WSM is updated.

The WSM update process may be performed by using the existing WSEM and also another matrix referred to herein as the write strategy sensitivity matrix (WSSM). The WSSM, which is described further below with reference to FIG. 15 and FIG. 16, captures shifts in read signal threshold crossings that arise from perturbations in the edge locations of the write laser pulse. The WSSM is thus an indexed set of numbers specifying, for transitions having a certain set of indices, the sensitivity of the read signal location to changes in the location of the write signal edge. Some optical data storage media show very close to a 1 to 1 correspondence between write laser edge perturbations and read signal transition shifts with very little cross talk between neighbors. For these media, the WSSM is close to unity, and in these cases it may be possible to avoid the computation of a WSSM and simply adopt it as equal to the unity matrix.

Using the WSSM and the WSEM, at state 1408 an updated WSM is determined by solving the appropriate linear matrix equations representing the relationship of the WSSM and the WSEM to the WSM. Conceptually, combining a knowledge of read signal errors using the current WSM with the knowledge of read signal sensitivity to changes in write laser edge positions allows appropriate modifications to the current WSM to be computed so as to reduce or eliminate the read signal errors. The WSEM and WSSM may be created in either order.

After updating the WSM, it is used to write data, and another WSEM is computed using the updated WSM. If the elements of the new WSEM are still above the threshold at step 1412, the system may loop back to state 1408 and again update the WSM as described above. If, however, at state 1412 it is determined the WSEM is within the error threshold, the write-compensation process has now been completed and it ends at state 1414.

Figure 15:
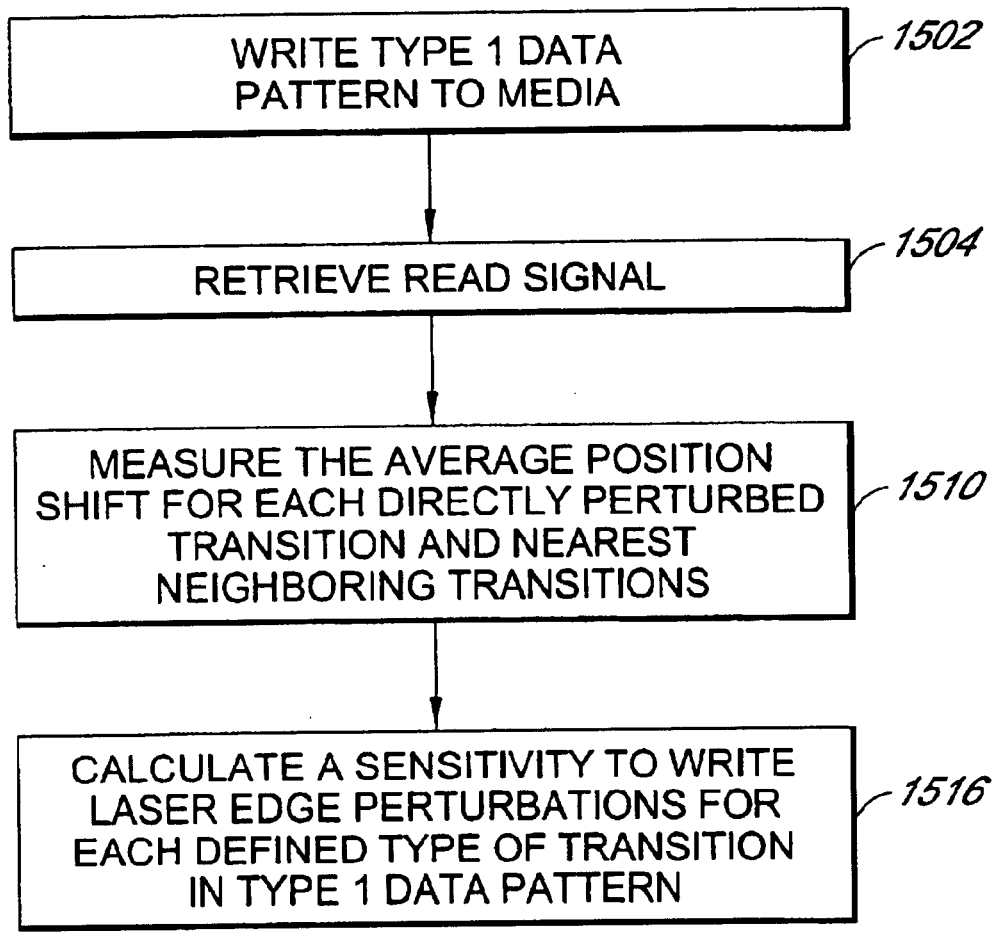
FIG. 15 is a flow chart illustrating a method of computing a write strategy sensitivity matrix.
Figure 16:
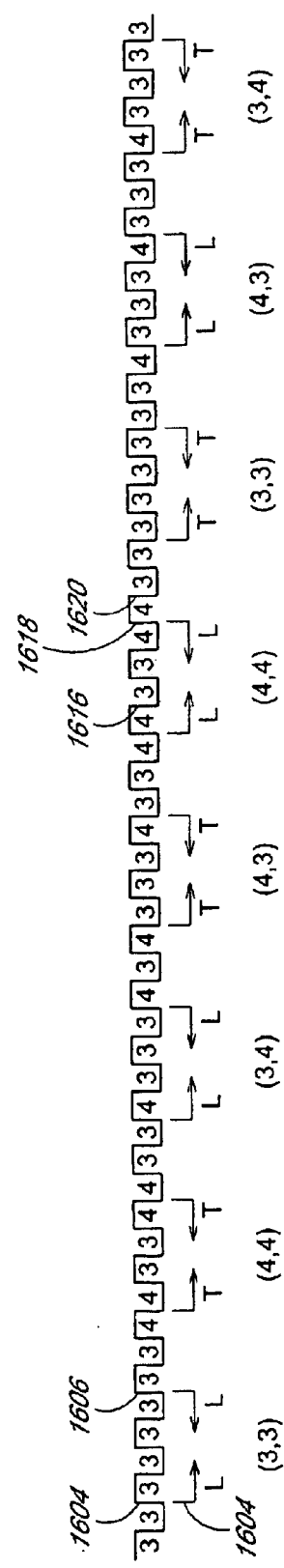
FIG. 16 is an illustration of one embodiment of a data pattern used to derive a write strategy sensitivity matrix.

Referring now to FIGS. 15 and 16, one process of deriving a WSSM will be described. FIG. 15 is a flowchart of the process of determining the sensitivity values for the elements of the WSSM. The process begins at state 1502 where a data pattern is written to the media using laser pulses defined by the content of an initial WSM. This data pattern is referred to herein as a Type 1 data pattern, and is written with deliberately perturbed edges in the write laser pulses. This is done so that the magnitude of shifts in the read signal threshold crossing locations can be measured with known shifts in write laser edge locations to determine the sensitivity of different transition types to shifts in write laser edge positions. In some embodiments, multiple copies of the Type 1 data pattern are written so that an averaging can be performed over several measured read signal shifts for each transition type. In one embodiment, 128 copies of the Type 1 data pattern are written. One example of a suitable Type 1 data pattern is illustrated in FIG. 16. In this embodiment, the Type 1 data pattern includes only the combinations of 3T and 4T marks, with corresponding leftward or rightward shifts as it was found that marks longer than 4T behaved nearly identical to 4T marks with respect to their sensitivity to write laser edge perturbations. The arrows 1602 in FIG. 16 indicate which edges are shifted, as well as the direction of the shift. For example, edge 1604 is shifted to the right (delayed) and edge 1606 is shifted to the left (advanced). The amount of shift $\epsilon$ can vary, with T/16 having been found suitable in some embodiments of the invention. The "L" and "T" beneath each arrow 1602 indicates the "leading" or "trailing" edge, respectively, of the write laser pulse.

After writing, at state 1504, the data pattern is retrieved from the media and at state 1506, the edge position for each directly perturbed read signal threshold crossing is determined. The positions for those read signal threshold crossings that are adjacent to the directly perturbed threshold crossings are also measured. Referring again to FIG. 16, for example, a shift of magnitude $\epsilon$ to the left in the leading edge of the writing laser pulse applied to edge 1618 causes shifts in the read-back signal for edges 1618, 1616 and 1620. Hence, the system obtains a measurement of the shift in the edges 1616, 1618, and 1620 caused by the leftward shift of the edge of the recording laser pulse that writes the edge 1618.

The process then proceeds to state 1510 wherein the measured transition locations are averaged over across the multiple copies of the Type 1 data pattern that were written to the media. One embodiment of this averaging process is described in additional detail below.

At step 1516 a sensitivity value is computed for each different transition type that indicates how much a read transition location moves for a given shift in a particular write laser pulse edge. In one embodiment, the following formulas are used to compute the sensitivity values of the directly perturbed edge and its adjacent edges (see FIGS. 12A and 12B for notation):

$$s_{-1}^L(w_n, w_{n+1}) = \frac{(j_{n-1}^+ - j_{n-1}^-)}{2\varepsilon},$$

$$s_0^L = (w_n, w_{n+1}) = \frac{(j_n^+ - j_n^-)}{2\varepsilon}, s_1^L(w_n, w_{n+1}) = \frac{(j_{n+1}^+ - j_{n+1}^-)}{2\varepsilon}$$

where $s_o$ is the sensitivity of the directly perturbed edge, and $s_{-1}$ and $s_1$ are the sensitivities of the edges adjacent to the perturbed edge given movement of the center edge. If the transition from $w_n$ to $w_{n+1}$ is the leading edge of the recording laser pulse, the superscript "L" is used (as shown). The superscript "T" is used when the transition involves the trailing edge. There are thus six sensitivity values for each pair of intervals $\{w_n, w_{n+1}\}$, three for leading edges and three for trailing edges. For the Type 1 data pattern of FIG. 16, the pair of intervals $\{w_n, w_{n+1}\}$ can take on all four combinations of the marks 3T and 4T (i.e., $\{3,3\}$, $\{3,4\}$, $\{4,3\}$, and $\{4,4\}$); therefore, 24 (i.e., 4×6) sensitivity values are computed in this embodiment, which make up the elements of the WSSM. Computation of each of the 24 elements requires measuring two jitter values ($j^-$ and $j^+$) for a total of 48 measurements.

Figure 17:
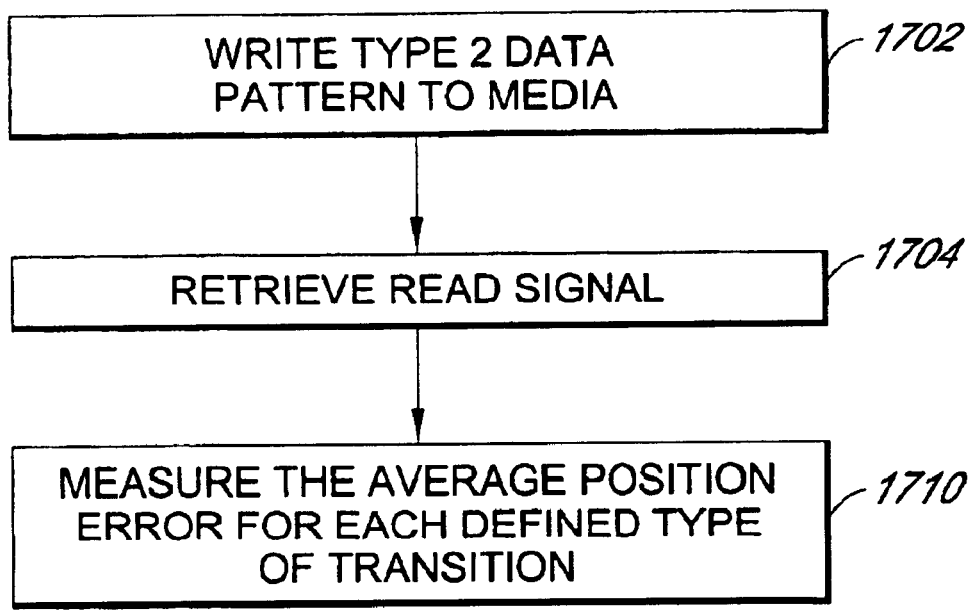
FIG. 17 is a flow chart illustrating a method of computing a write strategy error matrix.

FIG. 17 is a flowchart of the processes of determining the values of the elements to be used in the WSEM. The process starts at state 1702 where a Type 2 data pattern is written to the media. As with the Type 1 data pattern, the Type 2 data pattern may be written a plurality of times so that an averaging process can be used to produce the elements of the WSEM. However, in contrast to the Type 1 data pattern, the Type 2 data pattern is not written with deliberately perturbed edges, but is written as normal data with the currently effective WSM. The purpose of the Type 2 data pattern is to write all of the indexed transition types so that read signal transition errors for each type of transition can be measured. The Type 2 data pattern may comprise, for example, a pseudo-random sequence containing all of the 338 different transition types described above. In one embodiment, the Type 2 data pattern is constructed by puncturing a low RDS (Running Digital Sum) (7×4) deBruijn sequence. This sequence can be generated on the fly with a shift register as described above to eliminate the need for storing the desired pattern in a memory associated with the write circuit.

At state 1704, the reader retrieves the signal from the channel. At state 1706 the process then proceeds to state 1710 wherein the measured transition locations are averaged across the multiple copies of the Type 2 data pattern that were written to the media. One embodiment of this averaging process is described in additional detail below.

The timing errors for leading and trailing edges, for each combination of neighbor marks, are denoted herein by $$e(i_n, i_{n+1}, L) = j_n^L \text{ and } e(i_n, i_{n+1}, T) = j_n^T.$$

where i is the index described above with reference to FIG. 11, and where $j_n^L (j_n^T)$ is the average jitter measured for the leading (trailing) edge between the neighbor marks indexed by $i_n$ and $i_{n+1}$. These 338 measured error values e are the elements of the WSEM.

The WSSM and WSEM described above may be used to calculate corrections to the WSM. In one embodiment, a set of linear equations are formed which relate the WSM corrections to the measured errors and the measured sensitivities to changes in write laser pulse edge positions.

As illustrated above in FIGS. 12A and 12B, perturbing an edge of the laser write pulse also shifts the positions of neighboring transitions. Thus, to enhance the accuracy of the corrections to the WSM, the effect of corrections to one transition on corrections to adjacent transitions are also considered. This process may be simplified somewhat, however, as it has been found that when neighbors are farther than 4T apart, the effect on them from shifts in a directly perturbed transition is small enough to be ignored. Thus, for those indexed transitions of the 338 possible transitions that have no neighboring transition within 4T, the correction p to the WSM is calculated as follows:

$$-e(i_n, i_{n+1}, L) = (s_0(4, 4, L))(p(i_n, i_{n+1}, L))$$

This formula applies to transitions with $i_n$, $i_{n+1}$ indices where $i_n$ and $i_{n+1}$ are from 8 to 13, which includes 72 of the 338 different transition types.

However, for those transition types with a neighboring transition that is 4T or less away from the transition of interest, any corrections to the neighboring transitions may be taken into account when correcting the WSM entry for the transition of interest. If the transition of interest has only one neighboring transition at 4T or closer, a 2×2 matrix equation is used to obtain the WSM entry correction value such as follows:

$$-\begin{pmatrix} e(i_n, i_{n+1}, L) \\ e(i_{n+1}, i_{n+2}, T) \end{pmatrix} = \begin{pmatrix} s_0(w_n, w_{n+1}, L) & s_{-1}(w_{n+1}, w_{n+2}, T) \\ s_1(w_n, w_{n+1}, L) & s_0(w_{n+1}, w_{n+2}, T) \end{pmatrix} \begin{pmatrix} p(i_n, i_{n+1}, L) \\ p(i_{n+1}, i_{n+2}, T) \end{pmatrix}$$

where the w values in the sensitivities $s_0$ are equal to 4 for all w greater than or equal to 4, and the sensitivity $s_1$ or $s_{-1}$ is equal to 0 depending on whether it is the previous or subsequent interval that has a length w greater than 4. This 2×2 matrix equation applies to 168 of the 338 different transition types.

For those transition types having a neighboring transition within 4T on both sides, a 3×3 matrix equation is solved to obtain the WSM entry correction value:

$$-\begin{pmatrix} e(i_{n-1}, i_n, T) \\ e(i_n, i_{n+1}, L) \\ e(i_{n+1}, i_{n+2}, T) \end{pmatrix} =$$

$$\begin{pmatrix} s_0(w_{n-1}, w_n, T) & s_{-1}(w_n, w_{n+1}, L) & 0 \\ s_1(w_{n-1}, w_n, T) & s_0(w_n, w_{n+1}, L) & s_{-1}(w_{n+1}, w_{n+2}, T) \\ 0 & s_1(w_n, w_{n+1}, L) & s_0(w_{n+1}, w_{n+2}, T) \end{pmatrix}$$

$$\begin{pmatrix} p(i_{n-1}, i_n, T) \\ p(i_n, i_{n+1}, L) \\ p(i_{n+1}, i_{n+2}, T) \end{pmatrix}$$

where w in the sensitivity parameters is either 3 or 4, depending on whether the transition on the relevant side is 3T or 4T away from the transition being corrected. This equation applies to 49 of the 338 different transition types. All three of the above equations apply to a leading edge. For trailing edges, all L superscripts are changed to T, and all T superscripts are changed to L.

The p values in the correction vectors that relate to the previous and subsequent transitions are superfluous values that are ignored. In computing the final updates to the WSM, the 338 correction values p are selected such that all of the separate linear equations are satisfied simultaneously.

Figure 18:
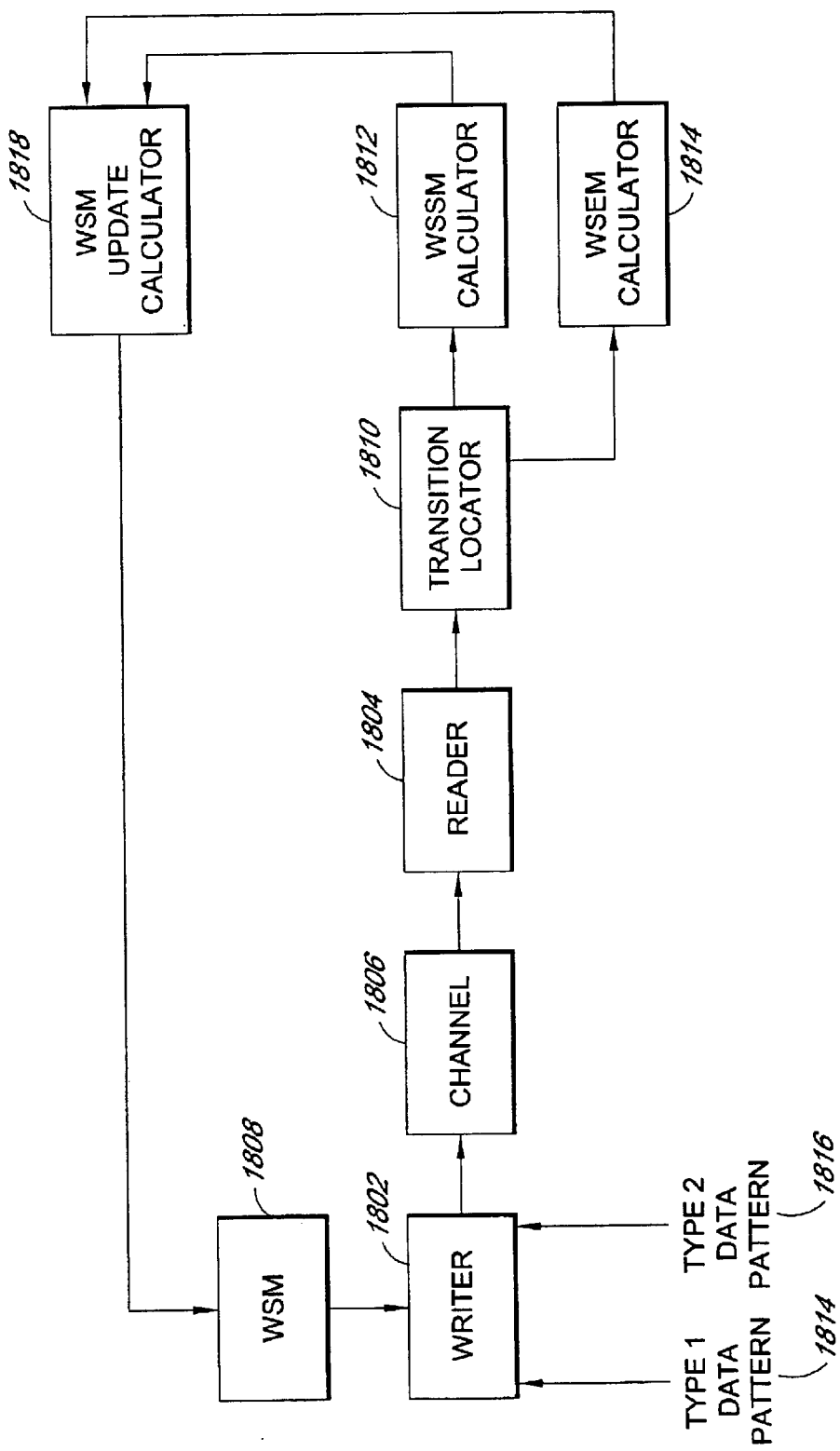
FIG. 18 is a block diagram of hardware for updating a write strategy matrix.

As mentioned above, the write compensation techniques described above can be applied to optical data storage and data communication systems. FIG. 18 is a functional block diagram of one embodiment of a write-compensation system implementing these techniques which may be incorporated into an optical disk drive or optical data communication system.

In the embodiment of FIG. 18, the system comprises a writer 1802, a reader 1804, and a data communication and storage channel 1806. In operation, the writer 1802 writes a Type 1 data pattern 1814 and a Type 2 data pattern 1816 using an initial WSM 1808. Information regarding the read back characteristics of the Type 1 data pattern is used to create the WSSM, and information regarding the read back characteristics of the Type 2 data pattern is used to create the WSEM as described above.

Using a transition locator 1810, the system determines the placement of read signal threshold crossings when reading the Type 1 and Type 2 read signals. Using the information from the transition locator 1810, the WSSM calculator 1812 outputs a write strategy sensitivity matrix (WSSM). The WSSM provides information to the WSM update calculator 1818 about how much to move the laser pulse edge in order to cause the read signal threshold crossing to move a given amount. Similarly, the WSEM calculator 1814 outputs a write strategy error matrix (WSEM) utilizing the information from the transition locator 1810. The WSEM provides information to the WSM update calculator 1818 about the deviation of the measured read signal threshold crossings from their target location for different types of transitions. The WSM update calculator 1818, taking as input the WSSM and the WSEM, outputs updated write strategy matrix (WSM) parameters.

Figure 19:
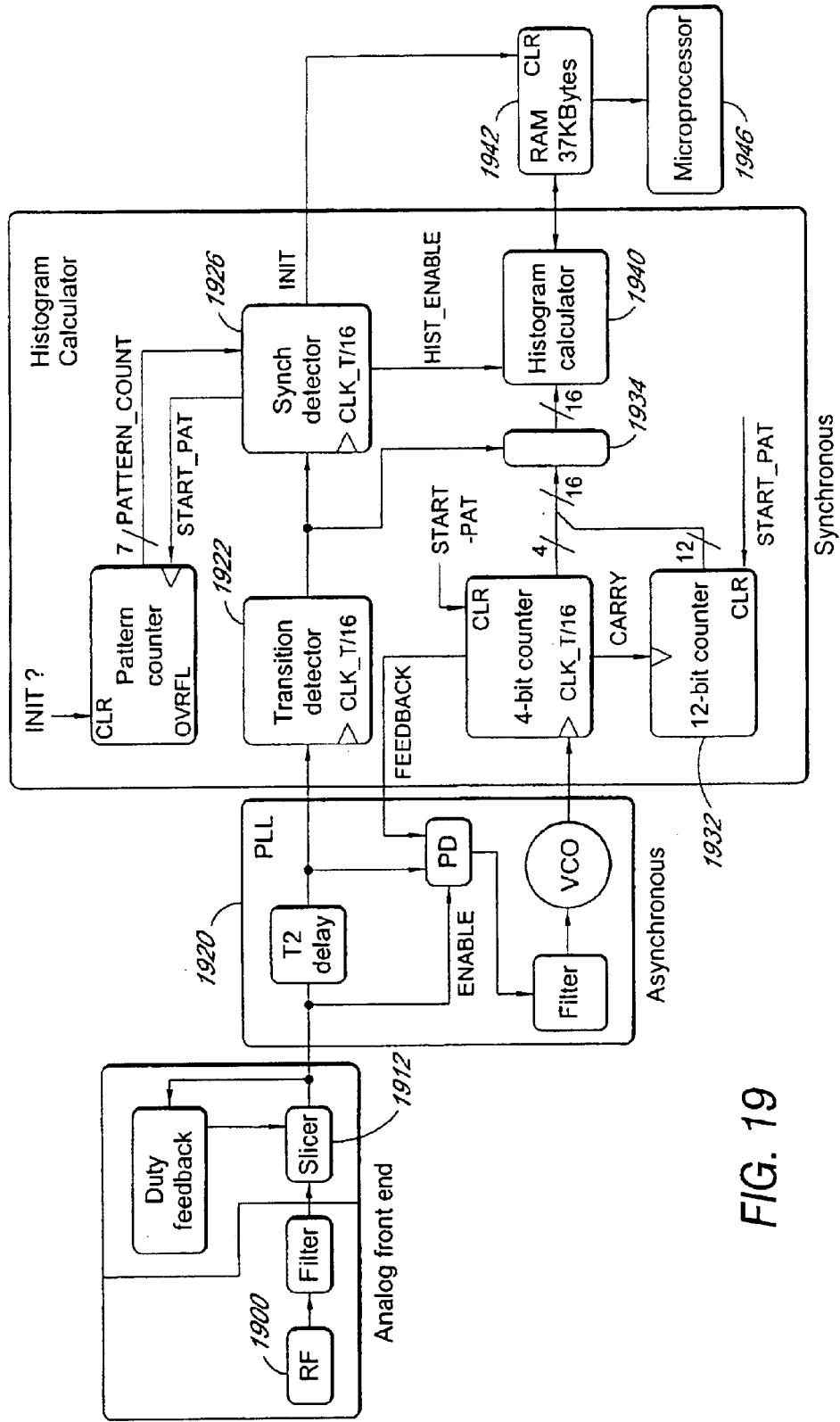
FIG. 19 is one embodiment of a transition detector and histogram calculator that may be used in the write strategy matrix calculation methods of the invention.

FIG. 19 is a block diagram of one embodiment of a reader and transition locator that may be used in the system shown in FIG. 18. Referring now to FIG. 19, the RF signal 1900 is first filtered and sliced by an analog front end to produce a clean, substantially square wave output signal having signal transitions corresponding to the signal transitions of the RF read signal input 1900. The output of the slicer 1912 is routed to a phase-locked loop circuit 1920 which extracts a clock signal from the read signal that has a frequency which is a factor of 16 higher than the read signal bit rate. The sliced signal is also routed to a transition detector 1922, which outputs a T/16 (It will be appreciated that this is just a typical resolution value—not an absolute) width pulse in response to each signal transition that is output from the slicer 1912. The transition detector 1922 thus locates to a resolution of T/16, the position of each read signal transition.

During the calibration process, these transition locations are recorded and analyzed. In one embodiment of generating the WSSM, for example, 128 copies of the Type 1 data pattern are read from the disk. The start of this data pattern is detected by a synch mark detector 1926 that monitors the pattern of transitions output by the transition detector. When the start of the repeated Type 1 pattern is indicated by the detection of the synch pattern, a pair of counters 1930, 1932 are cleared. In the embodiment of FIG. 19, one counter 1930 is a 4-bit counter that is incremented by the T/16 clock signal, and the second counter 1932 is a 12-bit counter that is incremented by the carry signal of the 4-bit counter 1930. The outputs of these counters 1930, 1932 are combined and fed to a 16-bit latch 1934. As the Type 1 data pattern is being read, each transition produces an output pulse from the transition detector 1922. In response to each of these pulses, the current 16 bit value of the combined counter outputs are retained in the latch 1934.

Also in response to each pulse from the transition detector 1922, a histogram calculator circuit 1940 will update a histogram of transition locations which is stored in a memory 1942. This process may be performed by using the latched in counter value as a pointer to an address location in the memory 1942. In response to the count, the content of the desired memory location is retrieved, the value stored there is incremented by one, and the incremented result is re-stored into the same location in the memory 1942. For the first copy of the Type 1 data pattern, therefore, a value of 1 will be stored in each memory location corresponding to a T/16 time bin within which a transition occurred. Referring back to the Type 1 data pattern shown in FIG. 16, therefore, the content of the memory will ideally be zeros for memory locations 0 through 47, and a 1 in location 48, because the first transition is 3T into the pattern, which is after 48 of the T/16 time bins. The next stored 1 should be near memory location 96, and so on.

For the each additional copy of the Type 1 data pattern that is read, the memory location accessed by the histogram calculator should start at memory location zero again at the start of each additional copy. As a specific example, the Type 1 data pattern of FIG. 16 is 183T long, which corresponds to 2928 T/16 time bins. Thus, a count of 2928 corresponds to address location 0 again. In general, the memory address that the histogram calculator 1940 presents to the memory 1942 is the remainder after dividing the latched in counter value by the total length of each individual data pattern in T/16 time bins.

Figure 20:
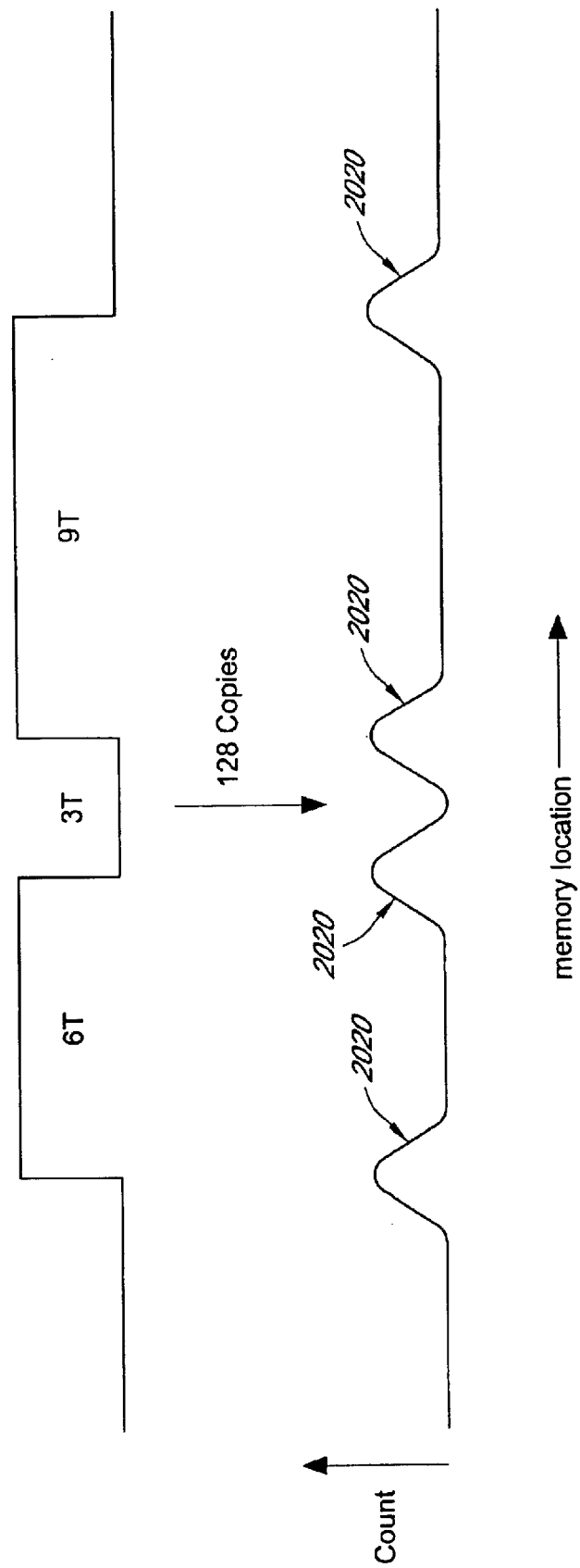
FIG. 20 illustrated one example of histogram construction using the system of FIG. 19.

The results of this process are illustrated in FIG. 20 for the four transitions defining adjacent 6T, 3T, and 9T marks centered in a 30T window. This corresponds to 30 times 16 time bins, resulting in the accessing and incrementing of 480 memory locations. If 128 copies of this transition pattern are read, the sum of the counts in the memory locations corresponding to each peak 2020 should total 128.

After acquisition, the data in the memory 1942 is processed by a microprocessor 1946, which can compute an average transition location for each transition of the data pattern from the distribution of each of the peaks 2020. This calculated average is used to calculate the WSSM and WSEM as described above. This method of accumulating the histograms is robust against missed transitions or extra transitions due to noise or other errors introduced into the system. For example, the histogram analysis algorithm can easily by designed to ignore isolated counts of 1 stored in memory locations that are not associated with a well established peak 2020.

The circuit of FIG. 19 is only one specific example of a circuit that can be used to measure and quantify transition locations. In other embodiments, the deviations of the readback edges from the expected edges can be computed by other methods. For example, the threshold level can be varied between read measurements, and the deviations of the read-back edges can be computed from the time bin in which the read-back edge falls as a function of threshold level used. As another example, the amplitude of the read-back signal can be sampled and digitized at the clock transitions. Both of these latter methods allow the transition times to be computed using longer time bins, which reduces the need for a high speed T/16 clock.

In another embodiment, phase noise may be added to the VCO in order to widen the histograms of the read-back signal so the mean threshold crossing position may be determined more accurately.

The above described write compensation procedures may also be adapted for constant angular velocity recording. In this recording technique, the optical disk spins at a constant angular rate, regardless of the radial position of the read head. This is in contrast with many currently commercially available optical drives, where the disk rotation rate is adjusted as the head moves radially during reading and/or writing such that the linear speed of the media below the read/write head is approximately constant at all radial positions of the read/write head.

The multi-level WSM contains the instructions for writing a multi-level mark as a function of its neighboring marks. Similarly, the binary WSM contains instructions for writing a binary mark as a function of its neighboring marks. By using the knowledge of the environment in which a mark will be written, one can compensate for the effects of writing neighboring marks on the current mark being formed. It is preferable when using either type of WSM (ML or binary) in a CAV mode (constant angular velocity mode) that the WSM change as a function of the linear recording velocity, and thus as a function or the radial position of the read/write head. To first order, two physical effects describe the basic difference between two WSMs optimized at two different recording speeds: 1) Scaling effects (mostly linear) and 2) Thermal effects (mostly non linear).

For a multi-level data cell to remain the same size and the multi-level mark to form the same fraction within the data cell, the duration of the writing laser pulse must scale with recording speed (i.e. a 100 ns pulse at 4.8 m/s illuminates the same portion of track as a 50 ns pulse at 9.6 m/s). Similarly, for a binary mark recorded at different recording speeds to have the same length, the duration of the write pulse must scale with recording speed. If this effect was the only effect of CAV writing, one could simply scale the writing clock by the disc speed and use one WSM for all radii. However, the thermal effects of writing at different speeds are not the same. As a result, the write strategy will advantageously compensate for these effects so that consistent data marks may be formed. For example, a particular amount of energy is necessary to deposit into the disc media in order to form a mark of a particular level. To keep the mark size the same at two different recording speeds, the pulse must be scaled by the recording speed. Therefore, in order to deposit the same amount of energy into that portion of disc, the power of the pulse should also change. However, different power levels will change the thermal dynamics of mark formation. This change in the thermal environment is reflected in a change in the optimal WSM.

CDRW write strategies may be specified for number of discrete recording speeds (e.g. 2x, 4x, 8x), and these write strategies will not be simply scaled versions of each other (their primary difference is the different duty cycles for the multi-pulse stream). For CAV recording, it is preferable to have a multitude of write strategies which are indexed by a single radial recording position. Because the typical WSM has a large number of parameters (i.e. 512 for a ML WSM and 338 for a binary WSM), it is useful to parameterize the WSM such that it can be represented by a just a few parameters. This more efficient representation makes it easier to represent the changes in the WSM for different recording speeds. If the WSM can be represented efficiently and one can identify a single parameter that optimizes the WSM for various recording speeds, then this single parameter can be tied to the radial position of the recording head and form the basis for a CAV (constant angular velocity) write strategy.

One method for implementing a WSM that changes during a recording session is to create two WSM buffers: one for writing and one for loading while writing with the other WSM. Because the radial position does not change much in one revolution (~1.6 um) one could page between and update the WSM at roughly the once-around rate. For ML recording, this corresponds to something about once per data block. The scaling of the pulse duration by the write speed could be performed by scaling the write clock, or could be performed by new pulse duration entries in the WSM itself.

The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of compensating a data write process in a data communication or storage channel, said method comprising:
    writing at least one data pattern to said channel using a write strategy matrix;
    reading said data pattern;
    deriving a sensitivity matrix for said channel from information obtained during said read process;
    deriving a systematic error matrix for said channel from information obtained during said read process;
    deriving write strategy parameters from said sensitivity matrix and systematic error matrix;
    updating said write strategy matrix using at least in part said write strategy parameters; and
    writing data using said updated write strategy matrix.

2. A method of compensating as recited in claim 1 wherein said write strategy parameters are configured to control the time course of writing laser pulses.

3. A method of compensating as recited in claim 1 wherein said write strategy parameters are derived so that data transitions in the output of said storage channel are adjusted to occur at desired points in time.

4. A method of compensating as recited in claim 1 wherein said channel includes an optical phase change data storage media.

5. A method of compensating as recited in claim 1 wherein said channel includes an optical dye based disc.

6. A method of compensating as recited in claim 1 wherein said channel includes a fiber optic communication channel.

7. A method of deriving a write strategy matrix that maps a plurality of input sequences to a plurality of write strategy parameters, said input sequences each including a plurality of input data elements, said method comprising:
    writing a data pattern to a storage channel;
    recovering an output data pattern from said storage channel;
    deriving channel sensitivities from said data pattern and said output data pattern;
    writing an input data sequence to said storage channel said input sequence including a plurality of subsequences;
    recovering an output data sequence from said storage channel;
    deriving systematic errors from said output data sequence; and
    using said sensitivities and said systematic errors to derive said plurality of write strategy parameters.

8. A method of deriving a write strategy matrix as recited in claim 7 wherein said sensitivities are derived by comparing data transitions.

9. A method of deriving a write strategy matrix as recited in claim 7 wherein said systematic errors are derived by comparing data transitions.

10. A method of deriving a write strategy matrix as recited in claim 7 wherein a subsequence contains three data elements.

11. A method of deriving a write strategy matrix as recited in claim 7 wherein a subsequence contains five data elements.

12. A method of deriving a write strategy matrix as recited in claim 7 wherein said channel includes a phase change optical media.

13. A method of deriving a write strategy matrix as recited in claim 7 wherein said storage channel includes a dye based optical media.

14. A method of improving a write strategy matrix, said write strategy matrix mapping a plurality of input sequences to a plurality of write strategy parameters, said input sequences each including a plurality of input data elements, said method comprising:
    writing a data pattern to a storage channel using said write strategy matrix;
    recovering an output data pattern from said storage channel;
    deriving sensitivities from said data pattern and said output data pattern;
    writing an input sequence to said storage channel using said write strategy matrix, said input sequences including a plurality of subsequences;
    recovering an output data sequence from said storage channel;
    deriving systematic errors from said output data sequence; and
    using said sensitivities and said systematic errors to adjust said plurality of write strategy parameters.

15. A method of deriving a write strategy matrix as recited in claim 14 wherein said sensitivities are derived by comparing data transitions.

16. A method of deriving a write strategy matrix as recited in claim 14 wherein said systematic errors are derived by comparing data transitions.

17. A method of deriving a write strategy matrix as recited in claim 14 wherein a subsequence contains three data elements.

18. A method of deriving a write strategy matrix as recited in claim 14 wherein a subsequence contains five data elements.

19. A method of deriving a write strategy matrix as recited in claim 14 wherein said storage channel includes a phase change optical disc.

20. A method of deriving a write strategy matrix as recited in claim 14 wherein said storage channel includes a dye based optical disc.

21. A method of deriving a write strategy matrix as recited in claim 14 where said writing an input sequence, recovering an output data sequence, deriving systematic errors, and using said sensitivities and said systematic errors are repeated at least once.

22. A method of compensating a data writing process in a binary optical disc storage channel using a write strategy matrix, said method comprising:
    shifting at least one of the data transitions in a first data pattern by a predetermined amount to form a perturbed data pattern;
    writing said perturbed data pattern to said storage channel;
    recovering said perturbed data pattern from said storage channel;
    comparing the timing of transitions in the recovered data patterns to determine timing sensitivities;
    generating a second data pattern having a plurality of binary levels;
    writing said second data pattern to said storage channel;
    recovering said second data pattern from said storage channel;
    comparing the timing of transitions in the recovered second data pattern to target timing transition locations to determine systematic errors;
    calculating write strategy parameters using said timing sensitivities and said systematic errors; and updating said write strategy matrix with said write strategy parameters.

23. A method of compensating a data writing process as recited in claim 22 wherein said second data pattern contains three binary levels.

24. A method of compensating a data writing process as recited in claim 22 wherein said second data pattern contains five binary levels.

25. A method of compensating a data writing process as recited in claim 22 wherein said binary optical disc storage channel includes a phase change optical media.

26. A method of compensating a data writing process as recited in claim 22 wherein said binary optical disc storage channel includes a dye based optical media.

27. A method of compensating a data writing process as recited in claim 22 where the data writing process uses a run-length-limited modulation.

28. A system for compensating a data writing process in a data storage or communication channel using a write strategy matrix, said system comprising:
  a writer configured to write a data pattern to a storage channel using said write strategy matrix;
  a processor configured to:
  (a) determine a sensitivity matrix for said storage channel;
  (b) determine a systematic error matrix for said storage channel; and
  (c) derive write strategy parameters from said sensitivity matrix and systematic error matrix, said processor being capable of updating said write strategy matrix with said write strategy parameters.

29. A system for compensating as recited in claim 28 wherein said write strategy parameters are configured to control the time course of writing laser pulses.

30. A system for compensating as recited in claim 28 wherein said write strategy parameters are derived so that data transitions in the output of said storage channel are adjusted to occur at desired points in time.

31. A system for compensating as recited in claim 28 wherein said storage channel includes an optical phase change media.

32. A system for compensating as recited in claim 28 wherein said storage channel includes an optical dye based media.

33. An optical data storage drive comprising:
  a memory storing a write strategy matrix;
  a write control circuit configured to control a write laser in accordance with said write strategy matrix;
  a read signal transition detector configured to measure the location of read signal transitions;
  a processing circuit coupled to said read signal transition detector and configured to update said write strategy matrix using at least in part locations of read signal transitions detected by said read signal transition detector; and
  a histogram calculator configured to determine a number of transitions within a selected time window.

34. The optical data storage drive of claim 33, wherein said write control circuit controls the timing of changes in write laser intensity in accordance with said write strategy matrix.

35. The optical data storage drive of claim 33, wherein said read signal transition detector is coupled to a clock signal operating at a multiple of the read signal transition rate.

36. The optical data storage drive of claim 33, wherein said processing circuit is configured to calculate a mean transition location from data received from said histogram calculator.

37. A system for deriving a write strategy matrix that maps a plurality of input sequences to a plurality of write strategy parameters, said input sequences each including a plurality of input data elements, said system comprising:
  a writer configured to write a data pattern to a storage channel;
  a reader configured to recover an output data pattern from said storage channel;
  a means for deriving sensitivities from said data pattern and said output data pattern;
  a means for writing an input sequence to said storage channel said input sequence including a plurality of subsequences;
  a means for recovering an output data sequence from said storage channel; and
  a processor configured to derive systematic errors from said output data sequence and use said sensitivities and said systematic errors to derive said plurality of write strategy parameters.

38. A system for deriving a write strategy matrix as recited in claim 37 wherein said sensitivities are derived by comparing data transitions.

39. A system of deriving a write strategy matrix as recited in claim 37 wherein said systematic errors are derived by comparing data transitions.

40. A system of deriving a write strategy matrix as recited in claim 37 wherein a subsequence contains three data elements.

41. A system for deriving a write strategy matrix as recited in claim 37 wherein a subsequence contains five data elements.

42. A system for deriving a write strategy matrix as recited in claim 37 wherein said storage channel includes a phase change optical disc.

43. A system of deriving a write strategy matrix as recited in claim 37 wherein said storage channel includes a dye based optical disc.

44. A system for improving a write strategy matrix, said write strategy matrix mapping a plurality of input sequences to a plurality of write strategy parameters, said input sequences each including a plurality of input data elements, said system comprising:
  a writer configured to write a data pattern to a storage channel using said write strategy matrix;
  a reader configured to recover an output data pattern from said storage channel;
  a means for deriving sensitivities from said data pattern and said output data pattern;
  a means for writing an input sequence to said storage channel using said write strategy matrix, said input sequences including a plurality of subsequences;
  a means for recovering an output data sequence from said storage channel;
  a processor configured to derive systematic errors from said output data sequence and to use said sensitivities and said systematic errors to derive said plurality of write strategy parameters.

45. A system for deriving a write strategy matrix as recited in claim 44 wherein said sensitivities are derived by comparing data transitions.

46. A system for deriving a write strategy matrix as recited in claim 44 wherein said systematic errors are derived by comparing data transitions.

47. A system for deriving a write strategy matrix as recited in claim 44 wherein a subsequence contains three data elements.

48. A system for deriving a write strategy matrix as recited in claim 44 wherein a subsequence contains five data elements.

49. A system for deriving a write strategy matrix as recited in claim 44 wherein said storage channel includes a phase change optical disc.

50. A system of deriving a write strategy matrix as recited in claim 44 wherein said storage channel includes a dye based optical disc.

51. A system for compensating a data writing process in a binary optical disc storage channel using a write strategy matrix, said system comprising:
- a pattern generator configured to generate data patterns having a plurality of binary levels;
- a writer configured to write said generated data patterns to said storage channel;
- a reader configured to recover said generated data pattern from said storage channel;
- a means for shifting at least one of the data transitions in at least one data pattern by a predetermined amount to form a perturbed data pattern;
- a comparator configured to compare the timing of transitions in the recovered perturbed data pattern to determine timing sensitivities;
- logic circuitry configured to compare the timing of transitions in a recovered unperturbed data pattern to determine systematic errors, calculate write strategy parameters using said timing sensitivities and said systematic errors, and update said write strategy matrix with said write strategy parameters.

52. A system for compensating a data writing process as recited in claim 51 wherein said data patterns contain three binary levels.

53. A system for compensating a data writing process as recited in claim 51 wherein said data patterns contain five binary levels.

54. A system for compensating a data writing process as recited in claim 51 wherein said binary optical disc storage channel includes a phase change optical disc.

55. A system for compensating a data writing process as recited in claim 51 wherein said binary optical disc storage channel includes a dye based optical disc.

56. A system for compensating a data writing process as recited in claim 51 where the data writing process uses a run-length-limited modulation.

57. A method of optimizing the performance of a data storage or communication channel, said method comprising:
- determining channel sensitivity to modifications in write signal parameters;
- detecting systematic errors in a read signal recovered from data written with a first set of write parameters;
- adjusting said write signal parameters by an amount determined from said channel sensitivity such that said systematic errors are reduced when data are written with said adjusted write parameters.

58. The method of claim 57, additionally comprising:
- determining systematic errors in a read signal recovered from data written with said adjusted set of write parameters;
- further adjusting said write signal parameters by an amount determined from said channel sensitivity such that said systematic errors are additionally reduced when data are written with said further adjusted write signal parameters.

59. The method of claim 58, wherein said write signal parameters are iteratively adjusted until said systematic errors are reduced below a predetermined threshold.

60. A method of adjusting a data write operation in an optical data storage or communication channel comprising:
- indexing transition types based on the pattern of neighboring transitions within a fixed time window of each indexed transition;
- defining a plurality of write strategy parameters corresponding to different ones of the indexed transitions; and controlling write laser operation in accordance with said plurality of write strategy parameters when writing the indexed transitions.

61. The method of claim 60, wherein said fixed time window comprises an 8T window on either side of each indexed transition.

62. The method of claim 60, wherein controlling write laser operation comprises controlling the timing of laser pulse edges.

* * * * *